United States Patent
Limberg

(10) Patent No.: US 6,384,858 B1
(45) Date of Patent: May 7, 2002

(54) SUPPRESSION OF CO-CHANNEL NTSC INTERFERENCE ARTIFACTS WHEN EXTRACTING TRAINING SIGNAL FOR A DTV RECEIVER EQUALIZER

(75) Inventor: Allen LeRoy Limberg, Vienna, VA (US)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/373,586

(22) Filed: Aug. 13, 1999

Related U.S. Application Data

(60) Provisional application No. 60/141,841, filed on Jul. 1, 1999, and provisional application No. 60/097,609, filed on Aug. 24, 1998.

(51) Int. Cl.$^7$ ................................................. H04N 5/38
(52) U.S. Cl. ........................ 348/21; 348/607; 375/350; 375/346
(58) Field of Search .......................... 348/21, 607, 611, 348/614, 725, 726, 470; 375/355, 365, 368, 346, 347, 348, 350; H04N 5/38

(56) References Cited

U.S. PATENT DOCUMENTS

| | | | |
|---|---|---|---|
| 5,561,468 A | * 10/1996 | Bryan et al. | 348/469 |
| 5,602,602 A | * 2/1997 | Hulyalkar | 348/21 |
| 5,818,544 A | * 10/1998 | Han | 348/725 |
| 5,978,424 A | * 11/1999 | Turner | 348/495 |
| 6,266,380 B1 | * 7/2001 | Wang | 375/319 |

* cited by examiner

*Primary Examiner*—Michael Lee
(74) *Attorney, Agent, or Firm*—Sughrue Mion, PLLC

(57) ABSTRACT

A digital television receiver has an equalizer filter and demodulates received ATSC digital television signal to recover a baseband signal. The ATSC digital television signal is subject to being accompanied at times by a co-channel NTSC analog television signal, which gives rise to undesirable demodulation artifacts in the baseband signal. Data field synchronizing signals extracted from a prescribed plural number of successive data fields in the baseband signal are combined to generate a training signal for the equalizer. This prescribed number is to chosen to reduce the energy of the undesirable demodulation artifacts as compared to the energy of the extracted training signal. In a receiver for the digital television signal prescribed in the 1995 ATSC standard, the prescribed number is preferably six or a multiple thereof.

15 Claims, 13 Drawing Sheets

US 6,384,858 B1

SUPPRESSION OF CO-CHANNEL NTSC INTERFERENCE ARTIFACTS WHEN EXTRACTING TRAINING SIGNAL FOR A DTV RECEIVER EQUALIZER

This application is filed under 35 U.S.C. 111(a) claiming pursuant to 35 U.S.C. 119(e)(1) benefit of the filing date of provisional applications serial Nos. 60/097,609 and 60/141,841 filed Aug. 24, 1998, and Jul. 1, 1999, respectively, pursuant to 35 U.S.C. 111(b).

The invention relates to adaptive channel equalizers for digital television receivers and, more particularly, to overcoming the effects of co-channel NTSC interference upon the updating of filter coefficients for such equalizers.

BRIEF DESCRIPTION OF THE INVENTION

The updating of filter coefficients for an adaptive channel equalizer included within a digital television (DTV) receiver is accomplished by one of two known types of adaptation method or by a combination of these two adaptation method types. The first type of adaptation method is referred to as the training signal type. The second type of adaptation method is referred to as the decision-directed type. Both types of adaptation method can be disrupted by demodulation artifacts of NTSC co-channel interference accompanying the demodulated baseband symbol coding recovered by the DTV receiver.

U.S. Pat. No. 5,331,416 entitled "METHODS FOR OPERATING GHOST—CANCELATION CIRCUITRY FOR TV RECEIVER OR VIDEO RECORDER issued Jul. 19, 1994 to C. B. Patel and J. Yang is of interest in regard to the training signal type of channel equalizer adaptation. U.S. Pat. No. 5,331,416 indicates that training signal components accumulate in accordance with scalar alegebra to exhibit increase in value relative to random noise, which accumulates in accordance with vector algebra to lower value.

A method to reduce the effect of demodulation artifacts of NTSC co-channel interference upon the adaptation method of the training signal type is described in U.S. patent application Ser. No. 09/151,209 filed Sep. 11, 1998 for A. L. R. Limberg, titled "METHOD OF OPERATING THE CHANNEL EQUALIZER IN A RECEIVER FOR DTV SIGNALS SUBJECT TO CO-CHANNEL NTSC INTERFERENCE", and assigned to Samsung Electronics Co., Ltd. pursuant to the terms of an employment agreement in force at the time the invention was made. U.S. patent application Ser. No. 09/151,209 describes a digital television signal being demodulated to generate a baseband symbol code signal accompanied at times by artifacts of interference from a co-channel analog television signal. A cascade filter connection is included in the receiver for supplying a cascade filter response to the digitized demodulator response. An adaptive channel equalization filter provided with adjustable filtering coefficients is included in the cascade filter connection together with a comb filter for suppressing the demodulation artifacts of interference from a co-channel analog television signal. The receiver includes a symbol decoder for supplying data responsive to the cascade filter response and an intersymbol-interference suppression filter for processing the data to compensate for the intersymbol interference introduced by the comb filter. The receiver includes apparatus for extracting a received training signal from the cascade filter response during times data field synchronizing signals occur in the digital television signals. A computer is included in the receiver and calculates the terms of a discrete Fourier transform of that training signal. The computer generates a discrete Fourier transform characterizing the channel by dividing those terms by corresponding terms of a discrete Fourier transform of a comb-filtered and match-filtered response to ghost-free training signal as stored in memory for the computer. The computer calculates the adjustable filtering coefficients of the adaptive channel equalization filter so as to complement the channel characterization.

U.S. patent application Ser. No. 09/151,209 further describes a receiver including a detector for determining whether or not there is significant interference from a co-channel analog television signal. When there is not significant interference from a co-channel analog television signal, the computer still calculates the terms of a discrete Fourier transform of that training signal. The computer generates a discrete Fourier transform characterizing the channel by dividing those terms, however, by corresponding terms of a discrete Fourier transform of a match-filtered, but not comb-filtered, response to ghost-free training signal as stored in memory for the computer. The computer calculates the adjustable filtering coefficients of the adaptive channel equalization filter so as to complement the channel characterization.

The differential delays involved in the comb filters described in U.S. patent application Ser. No. 09/151,209 are for the most part considerably shorter than the 48.4 millisecond duration of a data field. The exception is a comb filter having two-NTSC-frame differential delay. The longer-differential-delay comb filters described in U.S. patent application Ser. No. 09/151,209 combine NTSC signal from scan lines that are either correlated or anti-correlated in terms of image content so the comb filter will suppress the demodulation artifacts of the NTSC co-channel interference. U.S. patent application Ser. No. 09/151,209 describes the accumulation of training signal extracted over a prescribed even number 2N of successive data fields to generate a received ghost-cancellation reference (GCR) signal with attendant ghosts.

There is no indication in U.S. patent application Ser. No. 09/151,209 that the number 2N of successive data fields over which accumulation of training signal takes place is a parameter that affects results beyond the reduction of random noise one skilled in the art would expect from the teaching in U.S. Pat. No. 5,331,416. There is no indication of there being preferred values of 2N for reducing the deleterious effects of NTSC co-channel interference.

The phase of each of the demodulation artifacts of co-channel NTSC video carrier, chroma subcarrier and sound carrier changes by a certain increment from one data field synchronization (DFS) signal to the next one data field later. Accumulation of training signal from successive DFS signals is preferably done such that the various phases of each these demodulation artifacts accumulates in accordance with vector algebra to low value while the DFS signal components accumulate in accordance with scalar alegebra to high value.

SUMMARY OF THE INVENTION

The filter coefficients of an adaptive equalizer for a digital television receiver are adjusted responsive to baseband symbol coding from which artifacts of NTSC co-channel interference have been suppressed by filtering. In accordance with the invention the filter coefficients of an adaptive equalizer for a digital television receiver are adjusted by a training-signal method using a training signal extracted from baseband symbol coding in which artifacts of NTSC co-channel interference have been suppressed in the following way. The data field synchronizing signals of a cycle of six data fields or a plurality of such cycles are accumulated. In this accumulation procedure the data field synchronizing signals from initial data fields of each data frame are accumulated in one sense of polarity, and the data field synchronizing signals from final fields of each data frame are accumulated in the opposite sense of polarity. The artifacts of co-channel NTSC interference are suppressed in the accumulation result, from which the training signal is extracted.

DETAILED DESCRIPTION

Figure 1:
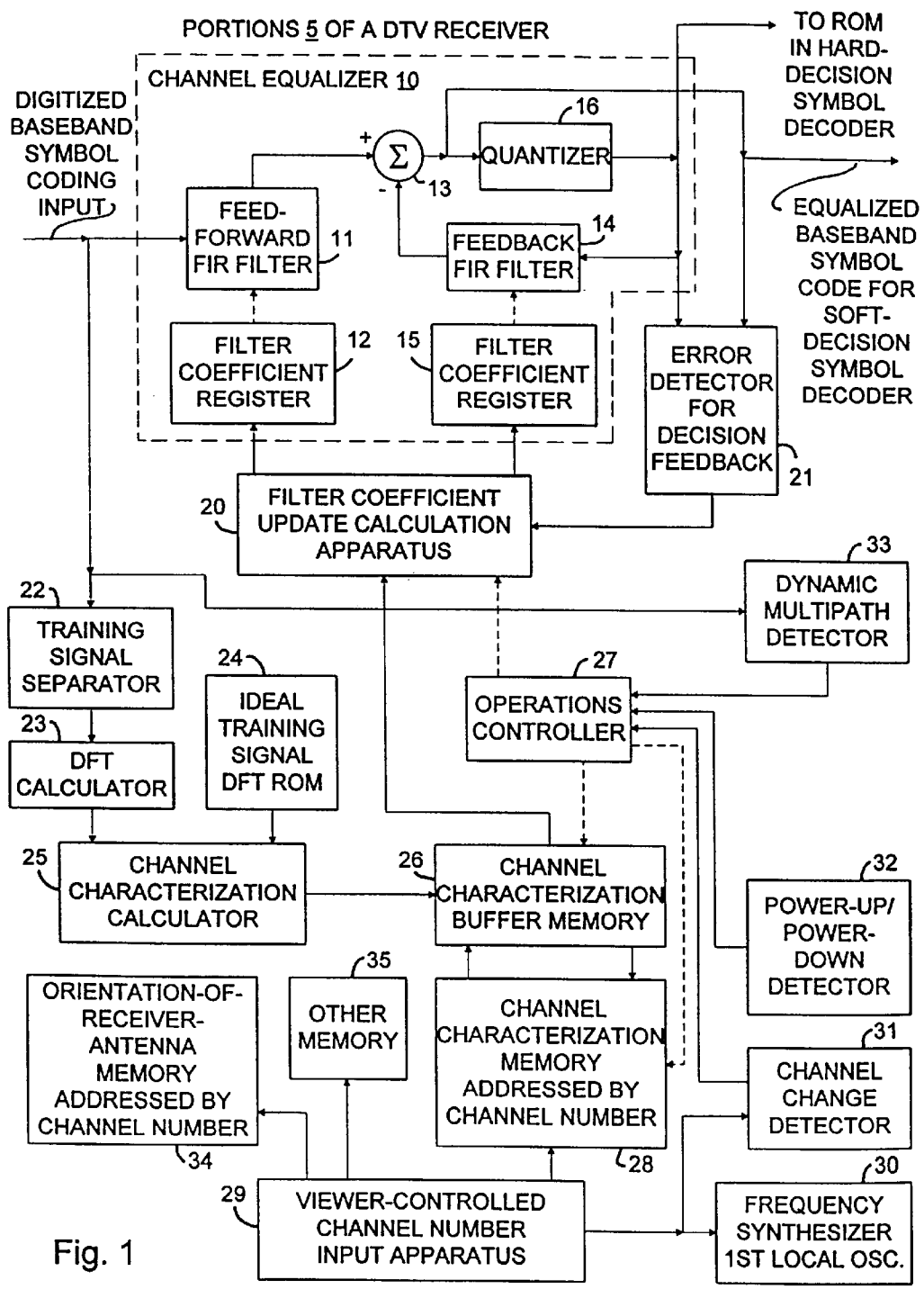
FIG. 1 is a schematic diagram of a channel equalizer developed for use in a digital television receiver, which channel equalizer includes a memory for storing channel characterization coefficient terms for each received channel and can be modified in accordance with the precepts of the invention.

FIG. 1 shows portions 5 of a DTV receiver as described in U.S. patent application Ser. No. 09/168,892 filed Oct. 9, 1998 for C. B. Patel, entitled "TV RECEIVER EQUALIZER STORING CHANNEL CHARACTERIZATIONS FOR EACH TV CHANNEL BETWEEN TIMES OF RECEPTION THEREFROM", and assigned to Samsung Electronics Co., Ltd. Digitized baseband symbol coding is supplied to a channel equalizer 10 comprising a finite-impulse-response (FIR) digital filter 11 having filtering coefficients stored in a temporary storage register 12, a digital subtractor 13, an FIR digital filter 14 having filtering coefficients stored in a temporary storage register 15, and a quantizer 16. The FIR filter 11 is operated in the channel equalizer 10 as a feed-forward FIR filter for suppressing near ghosts. The feed-forward FIR filter 11 helps suppress pre-ghosts, multipath responses that are received earlier than the principal DTV signal is received. The subtractor 13, the FIR filter 14 and the quantizer 16 combine to provide an infinite-impulse-response (IIR) filter. The FIR filter 14, which has filtering coefficients stored in a temporary storage register 15, is operated as a feedback FIR filter in this IIR filter. This IIR filter helps suppress post-ghosts, multipath responses that are received later than the principal DTV signal is received.

The digitized baseband symbol coding may be supplied to the channel equalizer 10 from a synchronous demodulator operated in the digital regime for demodulating digitized DTV intermediate-frequency signals. This arrangement is described in U.S. Pat. No. 5,479,449 entitled "DIGITAL VSB DETECTOR WITH BANDPASS PHASE TRACKER, AS FOR INCLUSION IN AN HDTV RECEIVER" issued Dec. 26, 1995 to C. B. Patel and A. L. R. Limberg. Alternatively, the digitized baseband symbol coding may be supplied from an analog-to-digital converter digitizing baseband symbol coding from a synchronous demodulator that demodulates DTV intermediate-frequency signals in the analog regime.

Filter-coefficient-update calculation apparatus 20 updates the contents of the temporary storage register 12 that holds the adaptive filter coefficients for the feed forward FIR filter 11. The calculation apparatus 20 also updates the contents of the temporary storage register 15 that holds the adaptive filter coefficients for the feedback FIR filter 14. Each of the temporary storage registers 12 and 15 is dual-ported, comprising a serial-in/parallel-out (or SIPO) component register and a parallel-in/parallel-out (or PIPO) component register. The initial stage of the SIPO component register can be serially written through a serial-input port; and the final output stage of the SIPO component register can be serially read through a serial-output port, which permits selective looping of the SIPO component register. Upon command, the stages of the PIPO component register are loaded in parallel from corresponding stages of the SIPO component register. The stages of the PIPO component register in the temporary storage register 12 supply their stored computer coefficients in parallel to digital multipliers in the FIR filter 11. The stages of the PIPO component register in the temporary storage register 15 supply their stored computer coefficients in parallel to digital multipliers in the FIR filter 14.

After initial adaptive filter coefficients for the FIR filters 11 and 14 are established, the calculation apparatus 20 inputs the adaptive filter coefficients temporarily stored in the registers 12 and 15, then updates the adaptive filter coefficients using correction accumulation procedures. The corrections to be used in these accumulation procedures are generated as fractions of errors detected by an error detector 21 for implementing decision feedback. To determine the error of each successive sample of the channel equalizer 10 response supplied from the difference output of the digital subtractor 13, the error detector 21 compares it with the quantized response of the channel equalizer 10 supplied from the quantizer 16.

The quantizer 16 is a digital bin comparator, with the bin numbers corresponding to ideal symbol code levels. So, the response of the quantizer 16 is forced to be one of the ideal symbol code levels. The quantizer 16 ideal symbol code levels can be supplied as input signal to a read-only memory (not shown) that contains a look-up table for decoding symbol codes on a hard-decision basis. The quantizer 16 and the ROM combine to function as what has been termed a "data slicer". The channel equalizer 10 output signal from the subtractor 13 is suitable for decoding symbol codes on a soft-decision basis using a Viterbi decoder. For details concerning symbol decoding the reader is referred to U.S. Pat. No. 5,508,752 entitled "PARTIAL RESPONSE TRELLIS DECODER FOR HIGH DEFINITION TELEVISION (HDTV) SYSTEM" and issued to D. J. Kim, H. S. Kwak and H. J. Nam on Apr. 16, 1996.

Ignoring the presence of severe noise in the channel equalizer 10 output signal from the subtractor 13, this signal will change amongst ideal symbol code levels when convergence is achieved in the channel equalizer, with multipath distortion being minimized. The quantizer 16 suppresses noise that does not extend beyond data-slice boundaries. Accordingly, including the quantizer 16 within the feedback path in the IIR filter portion of the channel equalizer 10 tends to speed up the final approach towards convergence to eliminate post-ghosts. These advantages are forfeited if the input signal for the feedback FIR filter 14 is taken directly from the difference output of the subtractor 13, instead of as shown in FIG. 1. These advantages also are forfeited if the IIR filter portion of the channel equalizer 10 precedes, rather than succeeds, the feed-forward FIR filter 11 in their cascade connection with each other. Including the quantizer 16 in the feedback loop also tends to stabilize the loop against spontaneous oscillation.

The digitized baseband symbol coding supplied to the channel equalizer 10 as input signal is also supplied to a training signal separator 22, which separates training signal from the data field synchronizing (DFS) signal. The training signal separator 22 contains a gating circuit (not shown) responsive to the count supplied from a data segment counter (not shown). When the count indicates that a data segment of a data field containing DFS signal and/or its ghosts appears in the digitized baseband symbol coding, the gating circuit applies the data segment from the current data field to an accumulator (not shown). The accumulator combines the DFS signals and their ghosts from a plurality of fields for extracting the ghosted training signal applied to a DFT calculator 23. When alternate DFS signals are differentially combined in the accumulation, accumulating the DFS signals over a cycle of six data fields or some multiple thereof suppresses artifacts of co-channel NTSC interference in the accumulation result, so channel equalization is less affected by these artifacts.

A read-only memory 24 stores the DFT of a ghost-free "ideal" training signal that is lowpass filtered according to the same Nyquist slope characteristic that one seeks for the upper-frequency portion of the transmission channel. This lowpass filtering of the ghost-free "ideal" training signal stored in ROM 24 is important for minimizing intersymbol interference. DTV receivers are designed attempting to minimize intersymbol interference by properly shaping the spectral response of the transmission channel for transmitting the symbol coding that is translated to digital baseband form for application to the channel equalizer 10. The spectral response is preferably subjected to final shaping after most of the amplification in the receiver has been done, so there is no introduction of a significant level of out-of-band noise by subsequent amplification. The Nyquist slopes at band edge can be established by surface-acoustic-wave filtering in VHF intermediate-frequency amplifiers of the DTV receiver, for example. As the DTV receiver is tuned from one transmission channel to another, however, there will be variations from the desired passband shape, which variations arise from causes other than multipath distortion. Such variations may arise from changing tilts in antenna gain response, for example. The filter coefficients of the adaptive channel equalizer are automatically adjusted to optimize the overall transmission channel characteristic for minimum intersymbol interference. This adjustment equalizes the received training signal so that it conforms to the "ideal" training signal as lowpass filtered according to the same Nyquist slope characteristic that one seeks for the upper-frequency portion of the transmission channel.

A channel characterization calculator 25 divides the DFT of the ghosted training signal supplied from the DFT calculator 23 with the DFT of a ghost-free training signal supplied from the ROM 24, term by term, to generate a DFT for the transmission channel. The channel characterization calculator 25 takes the inverse discrete Fourier transform of the DFT for the transmission channel to generate a description of the filtering effects exerted within the channel, which inverse DFT results are referred to as the "channel characterization". The channel characterization represents the filter coefficients of a filter that in the time domain would correspond to the transmission channel. The channel equalizer 10 has filter coefficients that are complementary to those of this filter that in the time domain would correspond to the transmission channel. Therefore, the cascade connection of the channel equalizer 10 after the transmission channel provides a composite response to transmitted symbol coding that is substantially free from intersymbol interference and multipath distortion effects.

In practice the filter-coefficient-update calculation apparatus 20, the DFT calculator 23, the channel characterization calculator 25 and the controller 27 are usually implemented within a single microprocessor with software appropriate for directing the calculations associated with each of the elements 20, 25 and 27. Storing the DFT of the Nyquist-filtered ghost-free training signal in ROM 24, rather than the Nyquist-filtered ghost-free training signal itself, eliminates having to calculate its DFT. This reduces the computational load on the microprocessor and speeds overall calculation of channel characterization.

The channel characterization is written, coefficient term by coefficient term as it is generated, into a channel characterization buffer memory 26 from which the channel characterization coefficient terms can be subsequently read. The channel characterization buffer memory 26 is preferably a random-access memory (RAM). Some time after the calculation of the channel characterization coefficient terms is completed, these terms are read from the memory 26 to the filter-coefficient-update calculation apparatus 20. Using procedures known from the prior art, the calculation apparatus 20 responds to these terms to generate a set of updated filter coefficients. (Refer, for example, to the above-referenced U.S. Pat. No. 5,331,416) Responsive to instruction from an operations controller 27, these updated filter coefficients are jam-loaded into the filter coefficient registers 12 and 15.

This set of channel characterization coefficient terms is also written into storage locations in a channel characterization memory 28. The channel characterization memory 28 is a random-access memory (RAM) each storage location of which is addressed by a respective binary number corresponding to the transmission channel that the DTV receiver currently selects for reception. A viewer-controlled channel-number input apparatus 29 generates this address. The channel characterization memory 28 is of a type that retains its stored contents when power is wholly removed or substantially removed from the DTV receiver. By way of example, the channel-number input apparatus 29 comprises a keypad and a serial-in/parallel out (SIPO) register for receiving the keypad input, located in the DTV receiver control panel or in a remote control unit. Also, the apparatus 29 further comprises a programmable read-only memory (PROM) for converting the keypad input stored in the SIPO register to a binary number used for addressing the channel characterization memory 28.

This binary number can form all or a part of the address for the channel characterization memory 28. The current state of a selector switch determining whether a terrestrial broadcast, a cablecast or a satellite narrowcast is being received can be used for generating bits to be appended to this binary number to form the address for the channel characterization memory 28. This allows different channel characterizations to be stored for the same radio-frequency tuning selection being made from the various types of source.

The viewer-controlled channel-number input apparatus 29 includes read-only memory for converting the keypad input stored in the SIPO register to a binary number used for controlling the frequency generated by a frequency synthesizer 30 that the DTV receiver uses as a first local oscillator. The DTV receiver selects the transmission channel the DTV receiver is to receive by superheterodyning the radio-frequency DTV signal with oscillations from the frequency synthesizer 30 as first local oscillator, to generate intermediate-frequency DTV signal that stays in the same band no matter which transmission channel is selected for reception.

The operations controller 27 controls how the adaptive filter coefficients of the channel equalizer 10 are updated. A channel change detector 31 detects when there is a change in the binary number used for controlling the frequency the frequency synthesizer 30 generates. By way of specific example, the channel change detector 31 can be constructed so as to periodically clock this binary number into a two-stage clocked delay line, differentially combine the binary numbers in the two stages, and combine the bits of the resulting difference in an OR gate. The OR gate generates a ZERO when there is no change in the transmission channel selected for reception. The OR gate generates a ONE when there is a change in the transmission channel selected for reception. When the channel change detector 31 signals the operations controller 27 that the transmission channel selected for reception has been changed, the operations controller 27 supplies a read command to the channel characterization memory 28 and a write command to the channel characterization buffer memory 26. The channel characterization stored at the location in memory 28 addressed by the channel-number input apparatus 29 is loaded to the channel characterization buffer memory 26. The coefficient terms of the channel characterization are then read to the to the filter-coefficient-update calculation apparatus 20, which generates a set of filter coefficients based from them. The operations controller 27 conditions the calculation apparatus 20 to jam-load this set of coefficients into the filter coefficient registers 12 and 15.

A power-up/power-down detector 32 detects when power is restored to the DTV receiver after having been wholly removed or substantially removed therefrom. When the power-up/power-down detector 32 signals the controller 27 that power is restored, the operations controller 27 supplies a read command to the channel characterization memory 28 and a write command to the channel characterization buffer memory 26. The channel characterization stored at the location in memory 28 addressed by the channel-number input apparatus 29 is loaded to the channel characterization buffer memory 26. The coefficient terms of the channel characterization are then read to the filter-coefficient-update calculation apparatus 20. The controller 27 conditions the calculation apparatus 20 to jam-load this set of coefficients into the filter coefficient registers 12 and 15. The FIR filters 11 and 14 in the channel equalization filter have filter coefficients supplied to them that are the same as when the transmission channel that the channel-number input apparatus 29 currently selects for reception was previously selected for reception.

The power-up/power-down detector 32 typically includes a capacitor charged from an operating voltage supply through a resistor, and a threshold detector for sensing when the capacitor reaches a substantial portion of full charge. A one-shot or other differentiating network responds to the threshold detector indicating the capacitor has reached a substantial portion of full charge for signaling the controller 27 that operating power has been restored.

So, whenever power is restored in the DTV receiver or there is a change in the transmission channel selected for reception, the FIR filters 11 and 14 are updated to have the same filter coefficients as they had at a previous time when the transmission channel currently selected for reception was received. This previous time was the last time that the channel was received without substantial dynamic multipath. The operations controller 27 determines the subsequent operation dependent on indications from a dynamic multipath detector 33 as to whether multipath conditions of a dynamic rather than static nature exist or not. If the dynamic multipath detector 33 indicates that multipath conditions of a dynamic rather than static nature do not exist, the filter coefficients of the FIR filters 11 and 14 are updated every few data fields in accordance with received training signal. The operations controller 27 conditions the calculation apparatus 20 to jam-load each new set of coefficients into the filter coefficient registers 12 and 15.

If the dynamic multipath detector 33 indicates that multipath conditions of a dynamic rather than static nature exist, the presumption is that the dynamic multipath conditions will interfere with the proper accumulation of data field synchronizing codes to acquire a training signal for adapting the channel equalizer 10 filter coefficients. Accordingly, the operations controller 27 withholds write enable signal from the channel characterization memory 28. Also, the operations controller 27 conditions the filter-coefficient-update calculation apparatus 20 not to jam-load into the filter coefficient registers 12 and 15 the filter coefficients that are calculated proceeding from the channel characterization coefficient terms. The operations controller 27 instead conditions the filter-coefficient-update calculation apparatus 20 to continually adjust the filter coefficients of the FIR filters 11 and 14 in accordance with a decision-feedback method utilizing the error signal supplied by the error detector 21. Adjustment is on a controlled-rate basis, with only a fraction of the change in each filter coefficient prescribed as a result of decision-feedback calculation being made after each calculation in a succession of iterated calculations.

By way of example, the dynamic multipath detector 33 can be of a type using principles disclosed in U.S. Pat. No. 5,684,827 entitled "SYSTEM FOR CONTROLLING THE OPERATING MODE OF AN ADAPTIVE EQUALIZER" issued Nov. 4, 1997 to L. E. Nielsen. The dynamic multipath detector 33 and the training signal separator 22 can use the same gating circuit (not shown) responsive to the count supplied from a data segment counter (not shown). The dynamic multipath detector 33 additively combines the data field synchronizing signals from each pair of successive data fields to null the middle 53-sample PN sequence that is inverted in logic sense from one data field to the next. The remaining signal level during this null period is sampled every data field. Variation between successive ones of these samples is measured to determine the degree of change in multipath over time.

The binary number the channel-number input apparatus 29 supplies for addressing the channel characterization memory 28 is used in the FIG. 1 portions 5 of a DTV receiver for addressing a memory 34 for storing information concerning previously optimized receiver antenna orientation information. Such information can be generated by automatic antenna orientation circuitry which at some time in the past has steered the antenna throughout its range(s) of adjustment while recording strength of received signal and has then returned the antenna to the position where recorded signal strength is the greatest. If the DTV receiver is designed to use a plurality of fixed antennas, the responses of which are electrically combined to select the direction of reception, the memory 34 is modified for storing the coefficients that determine how the contributions of the individual antenna responses to the overall antenna response chosen for television signal reception.

The binary number the channel-number input apparatus 29 supplies for addressing the channel characterization memory 28 is used in the FIG. 1 portions 5 of a DTV receiver for addressing other memory 35. By way of example, the other memory 35 can be used for storing any of the following types of information:

(a.) information concerning whether or not the channel characterization memory 28 has been programmed for the currently selected channel;

(b.) information concerning the available sources of received signal for a particular radio-frequency channel being tuned (such as cable or satellite narrowcast or terrestrial broadcast) and viewer preferences for implementing automatic selection of preferred source for each channel;

(c.) information concerning which channels are locked-out for viewing unless keying code is submitted (to prevent children viewing certain channels, etc.);

(d.) information concerning fine-tuning adjustments to the local oscillator(s) used in the DTV receiver;

(e.) information concerning adjustments to be made to the audio reproduction system for each transmission channel; and (f.) information concerning adjustments to be made to the video reproduction system for each transmission channel (to compensate for differences in station black level preferences, burst phase, etc. when receiving NTSC signals).

Storage in the other memory 35 of information concerning whether the channel characterization memory 28 has previously been programmed for the currently selected channel is particularly useful for supplying the operations controller 27 additional information for controlling operations.

Presume that the other memory 35 stores bit indications as to whether or not the channel characterization memory 28 has previously been programmed for the currently selected channel. The operations controller 27 can receive information (e. g., from a simple magnetometer) as to whether the DTV receiver was moved to its current location after the last time it was powered. Responsive to indication that the DTV receiver was moved, the operations controller 27 can direct the selective erasing of all indications stored in the memory 35 that channels had been previously programmed. The operations controller 27 can respond to an indication supplied from the memory 35 that the channel characterization memory 28 has previously been programmed for the currently selected channel, to direct initialization of the filter coefficients stored in the registers 12 and 15 as described supra. That is, the registers 12 and 15 are jam-loaded with the contents of the location in the channel characterization memory 28 addressed in accordance with the channel currently selected by the channel-number input apparatus 29. However, responsive to an indication supplied from the memory 35 that the channel characterization memory 28 has previously been programmed for the currently selected channel, the operations controller 27 can direct over-ride addressing of the channel characterization memory 28. This implements the jam-loading of the registers 12 and 15 from a storage location storing channel characterization coefficients for transmissions received free from multipath distortion.

After restoration of full power to the DTV receiver or after tuning to a different channel, there is a time interval before the dynamic multipath detector 33 is able to acquire sufficient information to indicate whether or not multipath conditions of a dynamic rather than static nature exist. During this interval the updating of the filter coefficients in the registers 12 and 15 continues being done on a recurrent jam-loading basis responsive to channel characterization coefficients calculated from training signals separated from baseband symbol coding. The operations controller 27 defers the writing of the channel characterization memory 28 from the channel characterization buffer memory 26 until the dynamic multipath detector 33 indicates that multipath conditions of a dynamic rather than static nature do not exist in substantial amount, unless the memory 35 has supplied the controller 27 an indication that the channel characterization memory 28 has not previously been programmed for the currently selected channel. If the memory 35 has supplied the operations controller 27 an indication that the channel characterization memory 28 has not previously been programmed for the currently selected channel, the controller 27 conditions the channel characterization memory 28 for being written from the channel characterization buffer memory 26. The rationale for doing this is that the actual channel characterization coefficients are likely to be a better starting point for equalization procedures than arbitrarily prescribed channel characterization coefficients.

The memories 28, 34 and 35 are each of a type that retains its stored contents when power is wholly removed or substantially removed from the DTV receiver. This can be provided for by arranging for power to continue to be applied to the memories 28, 34 and 35 (and to a remote control receiver, if such exists) at times application of power to other portions of the receiver is discontinued. However, if mains power is interrupted, the contents of the memories 28, 34 and 35 will be lost. So, after even a brief interruption in mains power, considerable time will be required to regain the lost content of the memories 28, 34 and 35. The time required for restoring the lost contents of the memories 28, 34 and 35 will be most noticeable if channel surfing is attempted after the failure of power. Accordingly, the memories 28, 34 and 35 are each preferably of electrically erasable programmable read-only memory (EEPROM) type. So is the PROM included in the channel-number input apparatus 29 for converting the keypad input stored in the SIPO register to addressing the memories 28, 34 and 35.

Figure 2:
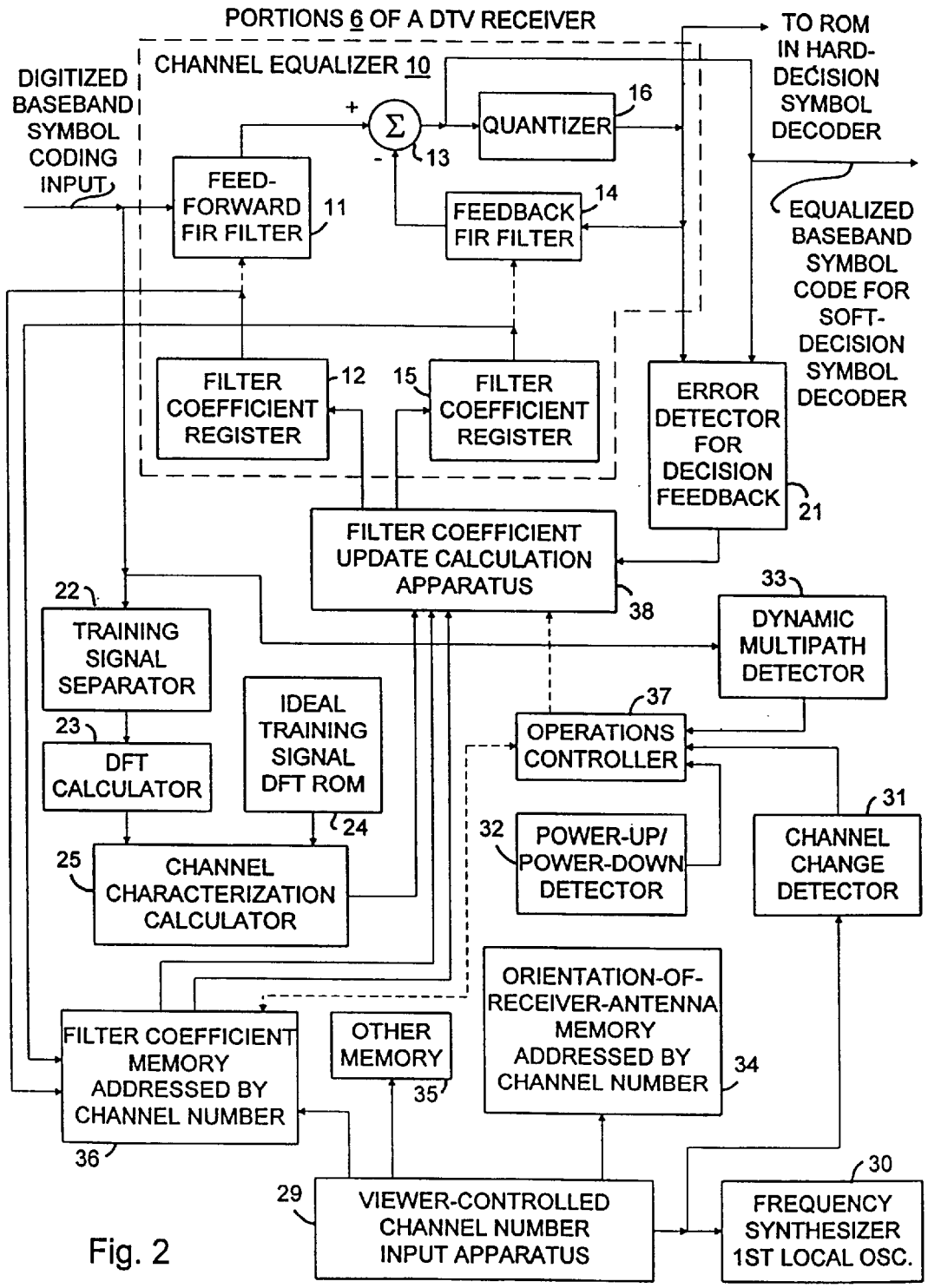
FIG. 2 is a schematic diagram of a channel equalizer which includes a memory for storing equalization filter coefficient terms for each received channel and can be modified in accordance with the precepts of the invention.

FIG. 2 shows portions 6 of a DTV receiver in which the filter coefficients in the registers 12 and 15 are retained in a filter coefficient memory 36 when the DTV receiver power is interrupted or there is a change in the transmission channel selected for reception. This is done, rather than retaining the channel characterization coefficients per FIG. 1 using the channel characterization memory 28. The retention of equalization filter coefficients in a filter coefficient memory for use when the DTV receiver power is restored or a transmission channel is again selected for reception was disclosed in U.S. Pat. No. 5,654,765. This patent entitled " CHANNEL EQUALIZER FOR DIGITAL TELEVISION RECEIVER HAVING AN INITIAL COEFFICIENT STORAGE UNIT" issued Aug. 5, 1997 to D. J. Kim.

The portions 6 of a DTV receiver shown in FIG. 2 do not include the channel characterization buffer memory 26 or the channel characterization memory 28. The operations controller 27 is replaced by a somewhat different operations controller 37. The filter-coefficient-update calculation apparatus 20 is replaced by a somewhat different filter-coefficient-update calculation apparatus 38. The filter coefficient memory 36 is a RAM each storage location of which is addressed by a respective binary number corresponding to the transmission channel that the DTV receiver currently selects for reception. The viewer-controlled channel-number input apparatus 29 generates this address.

The operations controller 37 controls how the adaptive filter coefficients of the channel equalizer 10 are updated. When the channel change detector 31 signals the operations controller 37 that the transmission channel selected for reception has been changed, the operations controller 37 supplies a read command to the filter coefficient memory 36. The filter coefficients stored at the location in memory 36 addressed by the channel-number input apparatus 29 are then read to the filter-coefficient-update calculation apparatus 38. The operations controller 37 conditions the calculation apparatus 38 to jam-load this set of coefficients into the filter coefficient registers 12 and 15.

When the power-up/power-down detector 32 signals the controller 37 that power is restored to the DTV receiver after having been wholly removed or substantially removed therefrom, the operations controller 37 supplies a read command to the filter coefficient memory 36. The filter coefficients stored at the location in memory 36 addressed by the channel-number input apparatus 29 are then read to the filter-coefficient-update calculation apparatus 38. The operations controller 37 conditions the calculation apparatus 38 to jam-load this set of coefficients into the filter coefficient registers 12 and 15.

So, whenever power is restored in the DTV receiver or there is a change in the transmission channel selected for reception, the FIR filters 11 and 14 are updated to have the same filter coefficients as they had at a previous time. At this previous time the transmission channel selected for reception was the same as that currently selected. This previous time was the last time that the channel was received without substantial dynamic multipath. The subsequent operation for as long as the DTV receiver continues to be fully powered and the same transmission channel continues to be selected for reception will now be described. The operations controller 37 determines the nature of this subsequent operation dependent on indications from a dynamic multipath detector 33 as to whether multipath conditions of a dynamic rather than static nature exist or not. Each time updating of the filter coefficients of the FIR filters 11 and 14 is completed by the filter-coefficient-update calculation apparatus 38 during this subsequent operation, the operations controller 37 supplies a write command to the filter coefficient memory 36. The updated filter coefficients for the FIR filters 11 and 14 are then loaded into the currently addressed location in the memory 36. In some designs the operations controller 37 directs this memory loading procedure responsive to the filter-coefficient-update calculation apparatus 38 signaling the controller 37 that a calculation of updated filter coefficients has been completed (e. g., by overflow from a sequence counter in the apparatus 38). In other designs the operations controller 37 directs the loading of the memory 36 after a time known to be sufficient for the apparatus 38 to complete the calculation of updated filter coefficients for the current operating mode.

If the dynamic multipath detector 33 indicates that multipath conditions of a dynamic rather than static nature do not exist, the operations controller 37 conditions the filter-coefficient-update calculation apparatus 38 for updating the filter coefficients of the FIR filters 11 and 14 every few data fields in accordance with received training signal. The filter-coefficient-update calculation apparatus 38 jam-loads the updated coefficients into the registers 12 and 15 after their calculation. The operations controller 37 supplies a write command to the filter coefficient memory 36 after the updating is done, and the updated filter coefficients for the FIR filters 11 and 14 are loaded into the currently addressed location in the memory 36.

If the dynamic multipath detector 33 indicates that multipath conditions of a dynamic rather than static nature exist, the presumption is that the dynamic multipath conditions will interfere with the proper accumulation of data field synchronizing codes to acquire a training signal for adapting the channel equalizer 10 filter coefficients. Accordingly, the operations controller 37 conditions the filter-coefficient-update calculation apparatus 38 not to jam-load into the filter coefficient registers 12 and 15 the filter coefficients that are calculated from training signal. The operations controller 37 instead conditions the filter-coefficient-update calculation apparatus 38 to continually adjust the filter coefficients of the FIR filters 11 and 14 in accordance with a decision-feedback method utilizing the error signal supplied by the error detector 21. Adjustment is on a controlled rate basis.

In the DTV receiver portions 5 and 6 shown in FIGS. 1 and 2, the controlled-rate adjustment of the filter coefficients of the FIR filters 11 and 14 can be carried out depending solely on the decision-feedback method utilizing the error signal supplied by the error detector 21. However, in actual practice it is preferable to use a variation of this method in which the filter coefficients of the FIR filters 11 and 14 are partially adjusted by the results of calculations based on the training signal, even though the training signal is corrupted by multipath distortion. The filter conditions are also partially adjusted responsive to the results of calculations based on decision feedback. The results of decision-feedback calculations are supplied more often than the results of training-signal calculations. Accordingly, in making the controlled-rate adjustments, the changes in filter coefficients prescribed as a result of decision-feedback calculations on signal other than training signal are weighted with a smaller scaling factor than the changes in filter coefficients prescribed as a result of training-signal calculations.

Figure 3:
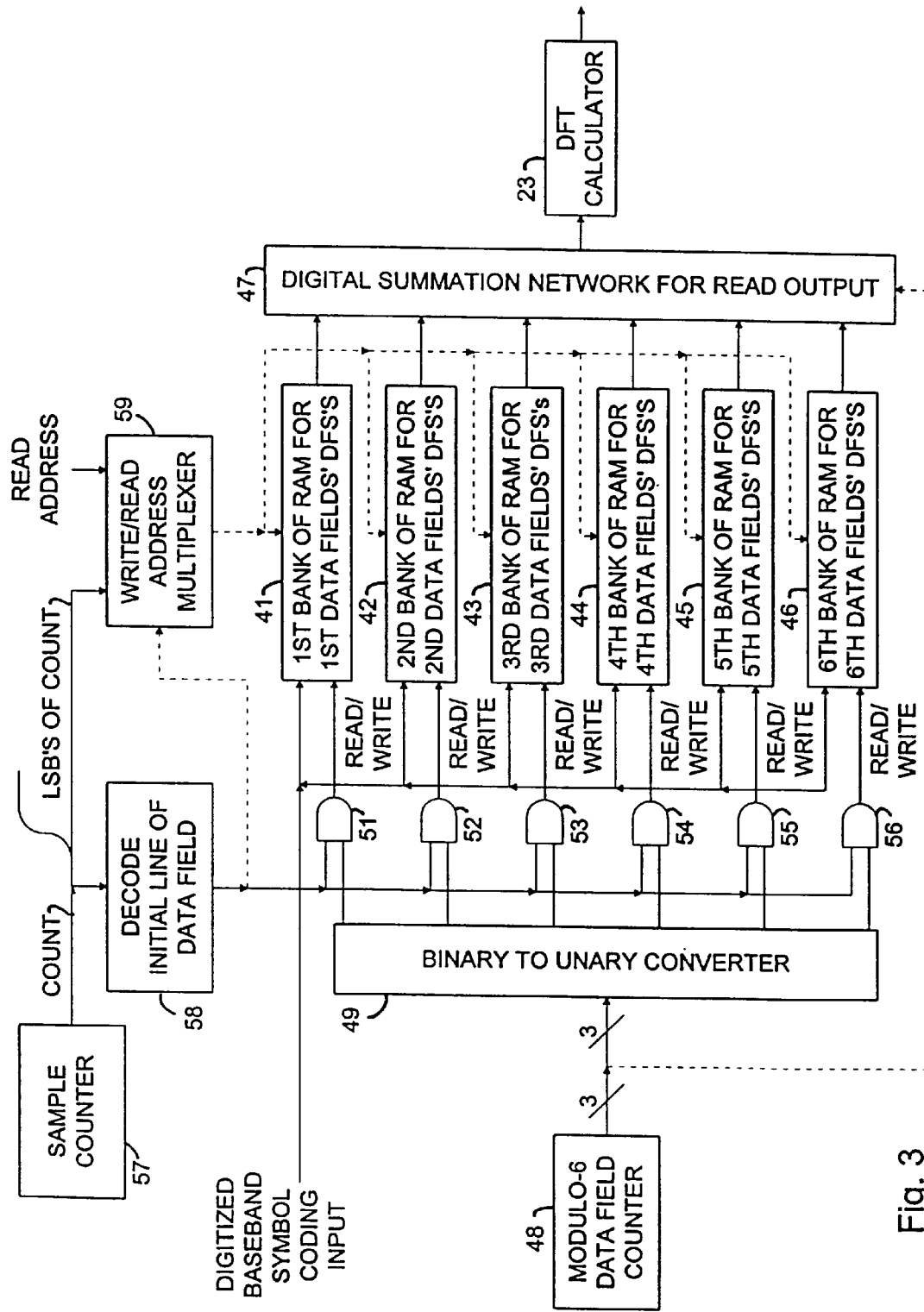
FIG. 3 is a schematic diagram of a training signal separator which can be employed in the FIG. 1 or FIG. 2 channel equalizer to generate a training signal in which artifacts of co-channel NTSC interference are reduced in accordance with the invention.

FIG. 3 shows a training signal separator which combines data field synchronizing signals from six successive data fields to generate a training signal in which demodulation artifacts of co-channel NTSC interference are reduced in accordance with the invention. More generally, a training signal in which artifacts of co-channel NTSC interference are reduced can be generated by combining data field synchronizing (DFS) signals from any succession of data fields that consists of a multiple of six data fields. Generating a training signal which combines DFS signals from twelve successive data fields provides training signal with better signal-to-noise ratio and involves an amount of hardware acceptable in practice, but inconvenient to show in a patent drawing.

The demodulation artifacts of co-channel NTSC interference are reduced, presuming that the video carrier of the co-channel NTSC interfering signal is 1.25 MHz from the lower boundary frequency of the channel and that the carrier of the DTV signal is 309,440.56 Hz from that lower boundary frequency. The demodulation artifact of the video carrier of the co-channel NTSC interfering signal is then at 940,559.44 Hz and has 22,758.86 cycles in the period of one data field, presuming there to be 41.3271804 data fields per second. Since there are so many cycles of the demodulation artifact per data field, small changes in the difference between video carrier and DTV carrier frequencies can quite strongly affect the fraction of a cycle in addition to the complete cycles per data field. In more sophisticated receiver designs this can be accommodated by adjusting the number of data fields over which initial data segments are accumulated in order to extract a training signal, the adjustments being made responsive to measurement of the difference between video carrier and DTV carrier frequencies. The accumulation of the initial data segments of a larger number of data fields tends to reduce the co-channel NTSC demodulation artifacts particularly if the number has several factors. For example, the accumulation of the initial data segments of eighteen data fields tends to reduce the co-channel NTSC demodulation artifacts if the fraction of a cycle in addition to the complete cycles per data field is close to 0, 1/18, 1/9, 1/6, 2/9, 5/18, 1/3, 7/18, 4/9, 1/2, 5/9, 11/18, 2/3, 13/18, 7/9, 5/6, 8/9 or 17/18 cycle.

The artifacts of the NTSC audio carrier cancel when corresponding samples of DFS signals from alternate data fields are accumulated in opposing senses of polarity for separating middle PN63 sequences. However, when corresponding samples of DFS signals from alternate data fields are accumulated in the same sense of polarity for separating the other PN63 sequences and the PN511 sequence, suppression of the artifacts of the NTSC audio carrier requires trap filtering of the NTSC audio carrier prior to demodulation of the baseband symbol coding.

When receiving DTV signals transmitted in accordance with the current ATSC standard, the artifacts of the NTSC video carrier shift phase by about $2\pi/3$ radians from data field to data field. The artifacts of the NTSC chroma subcarrier shift phase by about $-2\pi/3$ radians from data field to data field. Accordingly, each of these sets of artifacts tends to cancel over each cycle of six successive data fields when corresponding samples of DFS signals from alternate data fields are accumulated in opposing senses of polarity for acquiring accumulated middle PN63 sequences of the DFS signals. When corresponding samples of DFS signals from successive data fields are accumulated in similar senses of polarity for acquiring accumulation results for the other PN63 sequences and the PN511 sequence, the artifacts of the NTSC video carrier and chroma subcarrier each tend to sum to a zero-frequency (direct) component of filter response over each cycle of six successive data fields. Accumulation of DFS signals over 6N data fields, where N is a positive integer, is the preferable way to generate training signal with reduced accumulation of artifacts of the NTSC video carrier and chroma subcarrier.

FIG. 3 shows six banks 41, 42, 43, 44, 45 and 46 of random-access memory for temporarily storing DFS signals written to these banks from first, second, third, fourth, fifth and sixth data fields, respectively. Data fields are considered to be counted modulo-6 in accordance with the count output of a modulo-6 data field counter 47. The RAM banks 41, 42, 43, 44, 45 and 46 are read in parallel to a digital summation network 48 which combines their parallel read-out signals for generating the separated training signal supplied to the DFT calculator 23.

Consider the case in which corresponding samples of DFS signals from alternate data fields are accumulated in opposing senses of polarity for separating middle PN63 sequences. The operation in the digital summation network 48 is as follows or is the overall equivalent thereof. The signals read from the RAM banks 41, 43 and 45 are additively combined with each other within the digital summation network 48 to generate a first partial sum signal. The signals read from the RAM banks 42, 44 and 46 are additively combined with each other within the digital summation network 48 to generate a second partial sum signal. The first and second partial sums are differentially combined for generating the separated training signal supplied to the DFT calculator 23. If the least significant bit of the modulo-6 data field count from the counter 47 is a ONE, a multiplexer within the digital summation network 48 applies the first and second partial sum signals to the subtractor differentially combining them as minuend and subtrahend signals, respectively. If the least significant bit of the modulo-6 data field count from the counter 47 is a ZERO, the multiplexer applies the first and second partial sum signals to the subtractor differentially combining them as subtrahend and minuend signals, respectively.

Consider the alternative case in which corresponding samples of DFS signals from successive data fields are accumulated in similar senses of polarity for separating from the baseband symbol coding accumulations of the initial and final PN63 sequences and the PN511 sequence in each of six successive DFS signals. In such alternative case the digital summation network 48 is simply a six-input digital adder supplying the sum of the signals read in parallel from the RAM banks 41, 42, 43, 44, 45 and 46 for generating the separated training signal supplied to the DFT calculator 23.

The writing of the RAM banks 41, 42, 43, 44, 45 and 46 with DFS signals from successive data fields is enabled by their respective read/write control signals being ONE during initial data segments of those fields. FIG. 3 shows the RAM banks 51, 42, 43, 44, 45 and 46 receiving their respective read/write control signals from two-input AND gates 51, 52, 53, 54, 55 and 56, respectively. A binary number to unary number converter 49 decodes the modulo-6 count output from the data field counter 47 being one to supply a ONE to the first input connection of the AND gate 51. The binary number to unary number converter 49 decodes the modulo-6 count output from the data field counter 47 being two to supply a ONE to the first input connection of the AND gate 52. The binary number to unary number converter 49 decodes the modulo-6 count output from the data field counter 47 being three to supply a ONE to the first input connection of the AND gate 53. The binary number to unary number converter 49 decodes the modulo-6 count output from the data field counter 47 being four to supply a ONE to the first input connection of the AND gate 54. The binary number to unary number converter 49 decodes the modulo-6 count output from the data field counter 47 being five to supply a ONE to the first input connection of the AND gate 55. The binary number to unary number converter 49 decodes the modulo-6 count output from the data field counter 47 being zero to supply a ONE to the first input connection of the AND gate 56.

A sample counter 57 counts the samples in a data field, there being a plurality P in number of samples per symbol epoch. The sample counter is preferably constructed to count the data segments on a modulo-313 basis to generate the more significant bits of the sample count. This facilitates a decoder 58 decoding the initial data segment of each data field to supply a ONE to the second input connections of the AND gates 51, 52, 53, 54, 55 and 56. This ONE conditions the one of the AND gates 51, 52, 53, 54, 55 and 56 receiving a ONE at its first input connection to enable the writing of the one of the RAM banks 41, 42, 43, 44, 45 and 46 receiving its read/write signal from that AND gate.

The less significant bits of the sample count from the sample counter 57 preferably count the number of samples per data segment on a modulo-832P basis. A ONE is supplied by the decoder 58 when and only when the sample count from the counter 57 is indicative the current data segment is the initial data segment of a data field. This ONE conditions a write-address/read-address multiplexer 59 to address the RAM banks 41, 42, 43, 44, 45 and 46 with the less significant bits of the sample count from the sample counter 57 while one of these RAM banks is being written with current DFS signal. During other data segments of each field the decoder 58 supplies a ZERO output signal to the write-address/read-address multiplexer 59, conditioning that multiplexer to apply a read address to each of the RAM banks 41, 42, 43, 44, 45 and 46 during their being read from in parallel. This read address is a random-access address supplied from the DFT calculator 23 or its equivalent.

Figure 4:
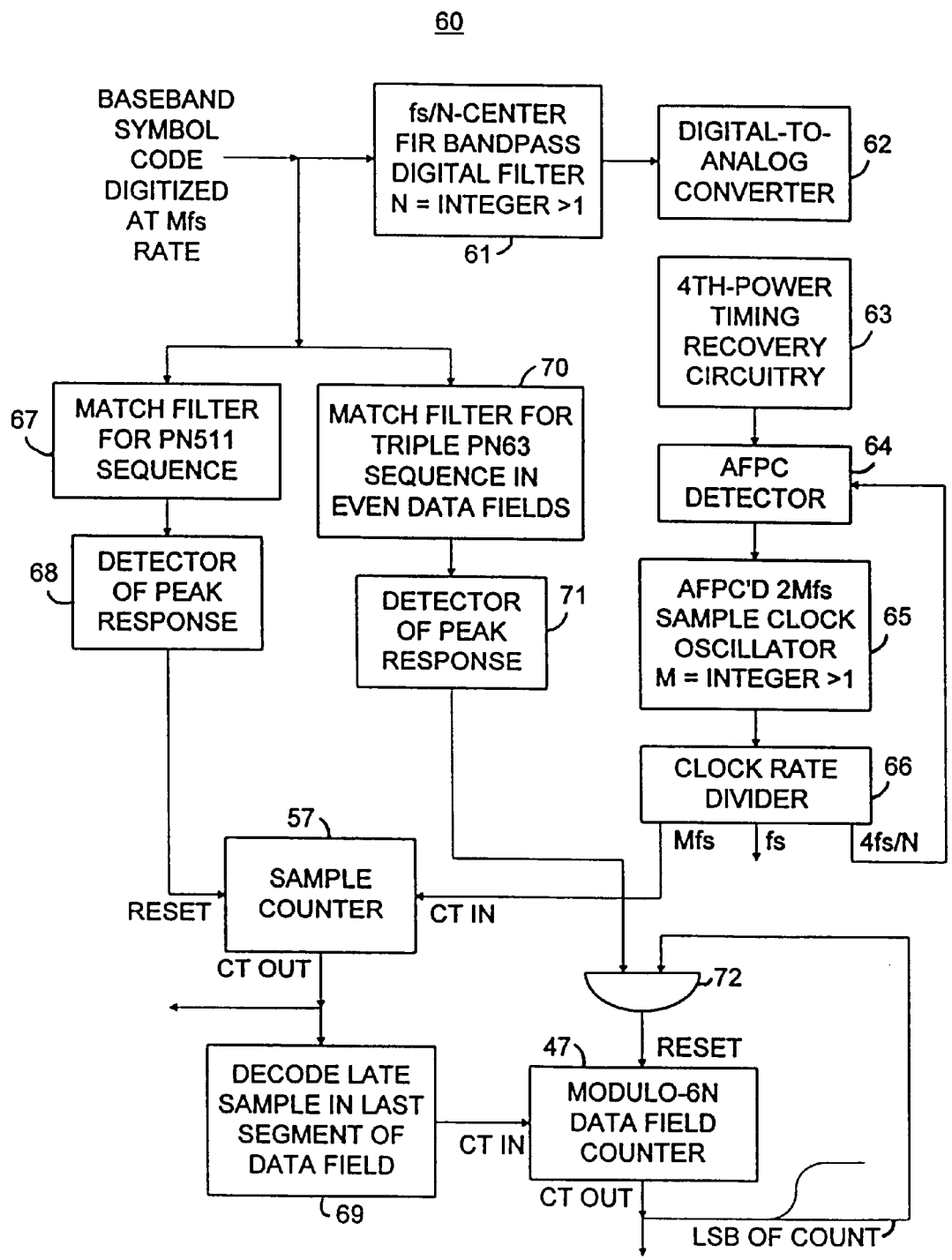
FIG. 4 is a schematic diagram of timing circuitry for the training signal separator of FIG. 3.

FIG. 4 shows details of the timing circuitry 60 for the training signal separator of FIG. 3. The timing circuitry 60 depends on a spectral line method of determining symbol rate known as envelope-derived timing. Digital samples of baseband symbol code are supplied at a multiple M of symbol rate to a finite-impulse-response (FIR) bandpass digital filter 61. The system function of the digital filter 61 response is a narrow bandpass response centered at a frequency equal to the symbol rate $f_s$ divided by N. M is an integer more than one, and N is an integer more than one. The bandpass digital filter 61 extracts the $f_s/N$ component of the digitized baseband symbol code, which is converted to an analog signal by a digital-to-analog converter (DAC) 62 for application to fourth-power timing recovery circuitry 63. The fourth-power timing recovery circuitry 63 supplies an output signal at $4f_s/N$ sample rate to an automatic-frequency-and-phase-control detector 64 that generates an automatic-frequency-and-phase-control (AFPC) signal for a sample clock oscillator 65. The sample clock oscillator 65 oscillates at 2M times symbol rate $f_s$ supplying those oscillations to a clock rate divider 66 that responds to supply sampling clock signals at symbol rate $f_s$, at M times symbol rate $f_s$, and at 4/N times symbol rate. The sampling clock signals at 4/N times symbol rate $f_s$ are supplied to the AFPC detector 64 to be compared with the fourth-power timing recovery circuitry 65 output signal at 4/N times symbol rate to generate the AFPC signal applied to the sample clock oscillator 65. The sampling clock signals at symbol rate $f_s$ are used by decimation circuitry in the channel equalization circuitry. The sampling clock signals at M times symbol rate $f_s$ clock the digital samples of baseband symbol code applied to the bandpass digital filter 61. The sampling clock signals at M times symbol rate are also supplied to the sample counter 57 for counting.

The extraction of the $f_s/N$ component of the baseband symbol code is done in the digital regime using the FIR digital bandpass filter 61, rather than in the analog regime. This avoids the problem of frequency-dependent phase shift at center frequency that is encountered with an analog bandpass filter of narrow bandwidth. The $f_s/N$ response of the digital filter 61 is converted to the analog regime to permit the fourth-power timing recovery circuitry 63 to be implemented in the analog regime free from sampling. This avoids problems with Nyquist sufficiency in the sampling of signals.

Under conditions of good reception of DTV signal the sample counter 57 is reset to a prescribed count responsive to the PN511 sequence in each data field synchronizing (DFS) signal. The digitized baseband symbol code is supplied to a match filter 67 for the PN511 sequence in each DFS signal. The match filter 67 generates a response that peaks at a prescribed sample epoch in the initial line of each data field. A detector 68 of such peak responses responds to supply a reset signal to the sample counter 57 for resetting its count to the value associated with a sample epoch just after that prescribed for the peak in PN511 match filter 67 response. The detector 68 can comprise a base-line clipper for isolating the larger amplitude portions of the PN511 match filter 67 response, a digital subtractor subtractor for subtracting from the current baseline clipper response the baseline clipper response of the previous sample epoch. The difference signal from the subtractor will change polarity to become negative the sample epoch next after that prescribed for the peak in the PN511 match filter 67 response. This change is used to reset the sample counter 57.

The more strict the criterion for ascertaining the specific PN511 sequence in the DFS signal has, the more likely it is that a poorly received PN511 sequence will be rejected. The sample counter 57 preferably has the capability of continuing to count the samples in data fields following such rejections. The best way of providing this capability is to roll over the count to beginning value after reaching the count associated with the conclusion of a data field.

A decoder 69 decodes the sample count from the counter 57 having a value associated with a sample near the conclusion of the final data segment in a data field to generate a ONE applied as count input to the data field counter 48 for counting data fields modulo-6N. This assures that the data field count will remain the same throughout the entire initial data segment of each data field. The oddness or evenness of the data field count is synchronized with whether or not in the current DFS signal the sense of polarity of the middle PN63 sequence is the same as or opposite from the sense of polarity of the initial and final PN63 sequences. The digitized baseband symbol code is supplied to a match filter 70 for the triple PN63 sequence in the DFS signal of even data fields. The match filter 70 generates a response that peaks highest at a prescribed sample epoch in the initial line of each data field. A detector 71 of such peak responses responds to supply a ONE to the first input connection of an AND gate 72 receiving at its second input connection the least significant bit of the modulo-6N data field count from the counter 48. The AND gate 72 output connection is to the reset connection of the counter 47. If the least significant bit of the counter 47 count is a ONE at the same time the detector 72 response is a ONE, the AND gate 72 response is a ONE that resets the counter 47 to zero count. If the least significant bit of the counter 47 count is a ZERO, or if the detector 71 does not supply the AND gate 72 a ONE, the AND gate 72 response is a ZERO and the counter 47 will not reset.

A match filter 70 for the triple PN63 sequence in the DFS signal of even data fields is preferably used rather than a match filter for the middle PN63 sequence of sense of polarity opposite initial and final PN63 sequences in the DFS signal. This is because the match filter 70 better discriminates against a PN63 sequence of such opposite sense of polarity occurring in a data segment of a data field other than its initial data segment.

The current preference is for digital samples of baseband symbol code at a multiple of symbol rate to be supplied from the channel equalizer as input signal to the FIR digital bandpass filter 61 in the timing circuitry 60 for the training signal separator of FIG. 3. This reduces jitter in the synchronization of sample clock timing with equalized baseband symbol coding, so that the decimation before data slicing can be more reliably timed to be done at the times when intersymbol interference is minimal. Alternatively, the output signal of the VHF intermediate-frequency amplifier can be supplied to an envelope detector, and the changes in the envelope owing to the pilot carrier interaction with the data demodulation can be detected and then digitized for generating the input signal to the filter 61.

Figure 5:
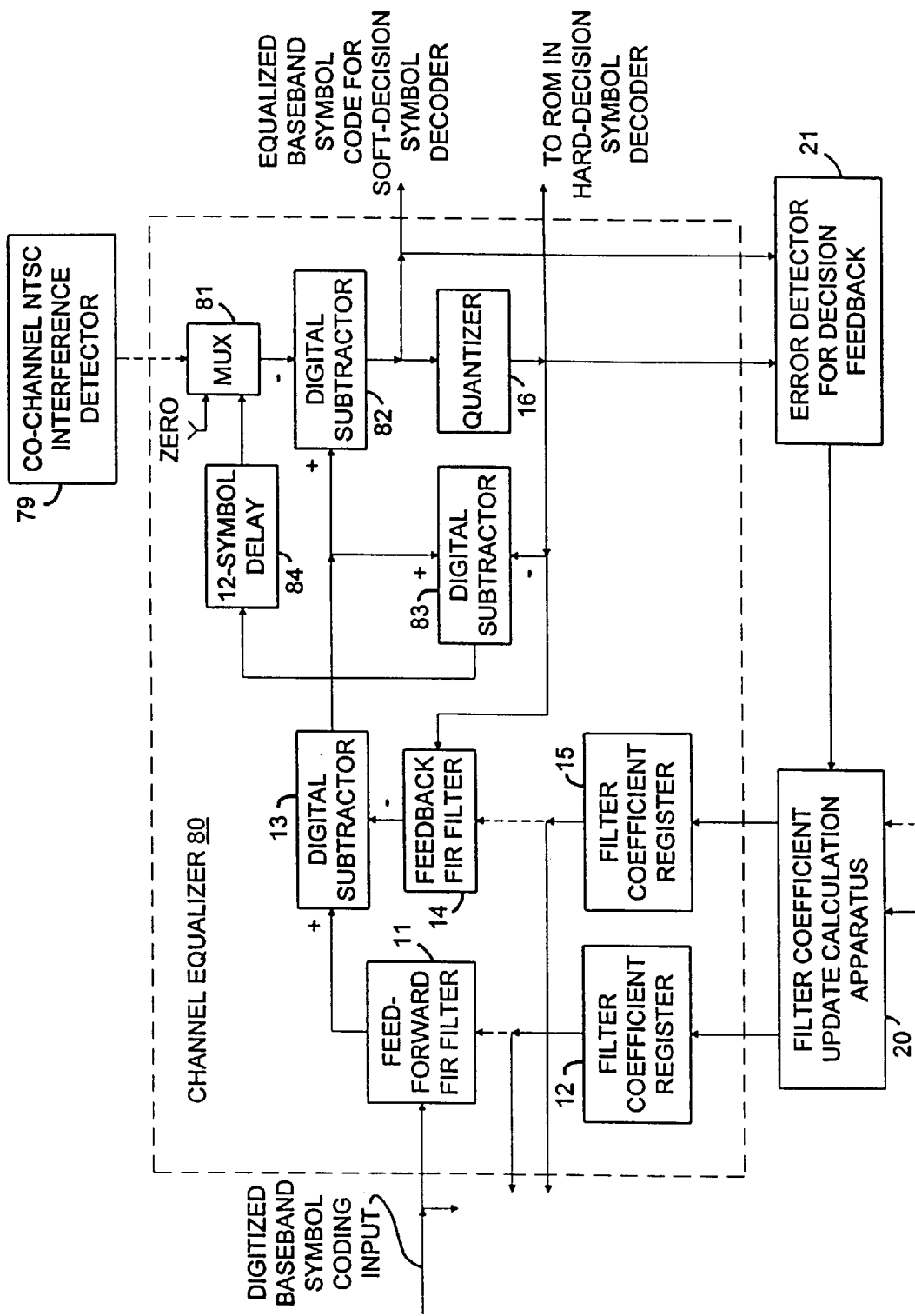
FIGS. 5 and 6 are schematic diagrams of respective modifications of the FIG. 1 or FIG. 2 channel equalizer made to mitigate the effects of artifacts of co-channel NTSC interference on channel equalization procedures employing decision-feedback.

FIG. 5 shows a co-channel NTSC interference detector 79 and a channel equalizer 80 that includes filtering for suppressing artifacts of co-channel NTSC interference. The co-channel NTSC interference detector 79 is used for detecting when the baseband symbol coding is accompanied by artifacts of co-channel NTSC interference. The channel equalizer 80 is a modification of the channel equalizer 10 of FIGS. 1 and 2 to include filtering for suppressing artifacts of co-channel NTSC interference in the baseband symbol coding. The co-channel NTSC interference detector 79 can take a variety of known forms. When the DTV receiver includes circuitry for receiving NTSC signals as well as DTV signals, a preferred form of co-channel NTSC interference detector 79 detects the level of the intercarrier generated by mixing audio and video carriers during DTV reception. This type of detector 79 is described in detail in allowed U.S. patent application Ser. No. 08/821,945 filed Mar. 19, 1997 by A. L. R. Limberg, entitled "USING INTERCARRIER SIGNALS FOR DETECTING NTSC INTERFERENCE IN DIGITAL TV RECEIVERS", and assigned to Samsung Electronics Co., Ltd.

When the co-channel NTSC interference detector 79 output signal indicates that artifacts of co-channel NTSC interference accompanying baseband symbol code in the equalization filter 80 input signal are insubstantial and unlikely to affect quantizing or data-slicing results, a multiplexer 81 is conditioned to reproduce its first input signal. The multiplexer 81 output signal applied to a digital subtractor 82 as subtrahend input signal is therefore a wired arithmetic zero. Accordingly, the difference output signal that the subtractor 82 supplies as input signal to the quantizer 16 reproduces the difference output signal of the subtractor 13 that the subtractor 82 receives as minuend input signal. Operation is substantially the same as in the channel equalizer 10 of FIGS. 1 and 2.

When the co-channel NTSC interference detector 79 output signal indicates that artifacts of co-channel NTSC interference accompanying baseband symbol code in the equalization filter 80 input signal are substantial and likely to affect quantizing or data-slicing results, the multiplexer 81 is conditioned to reproduce its second input signal. The second input signal of the multiplexer 81 is a predicted estimate of the current value of the artifact of co-channel NTSC interference accompanying baseband symbol code in the subtractor 13 difference output signal. This predicted estimate as it appears in the multiplexer 81 output signal is applied to the subtractor 82 as subtrahend input signal. The subtractor 82 subtracts this estimate from its minuend input signal, the difference output signal from the subtractor 13. The difference signal from the subtractor 82 comprises baseband symbol code with substantially no accompanying artifacts of co-channel NTSC interference and is supplied to the quantizer 16 as its input signal. To the extent there are no accompanying artifacts of co-channel NTSC interference in the quantizer 16 input signal, the operation of the channel equalizer 80 will remain similar to the channel equalizer 10 of FIG. 1 or 2.

In FIG. 5 the predicted estimate of the co-channel NTSC interference artifacts currently accompanying baseband symbol code in the subtractor 13 difference output signal is based on a revised estimate of the artifacts of co-channel NTSC interference accompanying a baseband symbol twelve symbol epochs earlier. A digital subtractor 83 receives the subtractor 13 difference output signal as its minuend input signal and receives the quantizer 16 output signal as its subtrahend input signal. The difference output signal from the subtractor 83 is a revised estimate of the artifacts currently accompanying baseband symbol code in the subtractor 13 difference output signal. This revised estimate does not affect the quantizing or data-slicing results already supplied by the quantizer 16, but is saved for use as a predicted estimate of the artifacts accompanying baseband symbol code in the subtractor 13 difference output signal twelve symbol epochs later. That is, the difference output signal from the subtractor 83 is applied to delay circuitry 84, which delays that signal by twelve symbol epochs before its application as second input signal to the multiplexer 81. For example, a shift register clocked at symbol rate provides for the delay circuitry 84.

Co-channel NTSC interference artifacts are reduced by the digital subtractor 82 differentially combining the estimated artifacts with actual artifacts in the generation of its difference output signal applied to the quantizer 16 as its input signal. The reduction of the co-channel NTSC interference artifacts in the quantizer 16 input signal and the resulting absence of the co-channel NTSC interference artifacts in the quantizer 16 output signal result in the error signal supplied by the error detector 21 being essentially non-responsive to co-channel NTSC interference artifacts. So, co-channel NTSC interference artifacts are prevented from affecting the adjustment of the filter coefficients of the FIR filters 11 and 14 by decision feedback method in any appreciable degree in the channel equalization filter 80 of FIG. 5.

Figure 6:
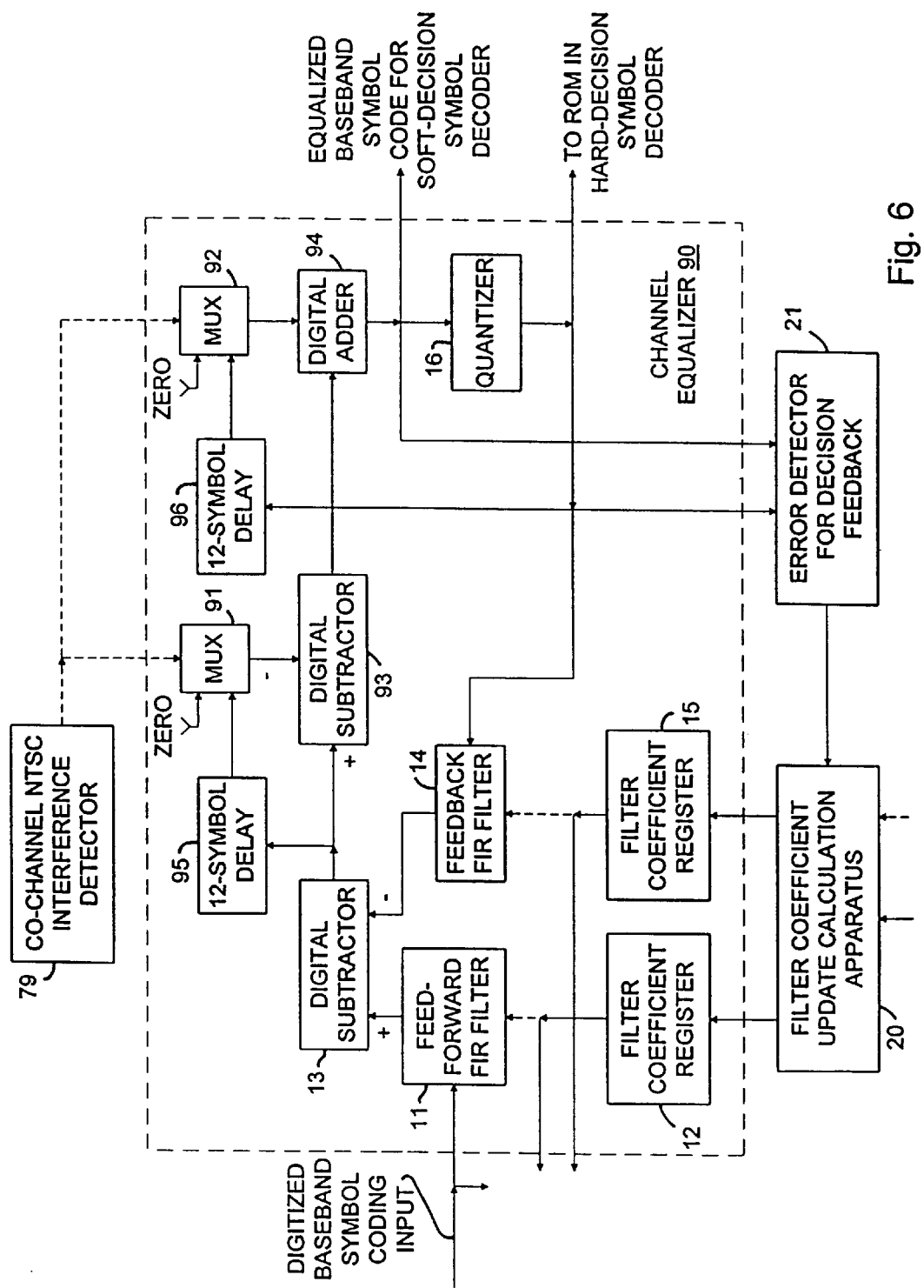

FIG. 6 shows an alternative channel equalization filter 90 in which co-channel NTSC interference artifacts are prevented from affecting the adjustment of the filter coefficients of the FIR filters 11 and 14 by decision feedback method in any appreciable degree. When the co-channel NTSC interference detector 79 output signal indicates that artifacts of co-channel NTSC interference accompanying baseband symbol code in the equalization filter 90 input signal are insubstantial and unlikely to affect quantizing or data-slicing results, multiplexers 91 and 92 are each conditioned to reproduce its respective first input signal. The multiplexer 91 output signal applied to a digital subtractor 93 as subtrahend input signal is therefore a wired arithmetic zero.

Accordingly, the difference output signal of the subtractor 13 received as minuend input signal by the subtractor 93 is reproduced in its difference output signal supplied as a first summand input signal to a digital adder 94. The multiplexer 92 output signal applied to the digital adder 94 as a second summand input signal is also a wired arithmetic zero. So, the difference output signal of the subtractor 13 is further reproduced in the sum output signal that the adder 94 supplies to the quantizer 16 as its input signal. Operation is substantially the same as in the channel equalizer 10 of FIGS. 1 and 2.

When the co-channel NTSC interference detector 79 output signal indicates that artifacts of co-channel NTSC interference accompanying baseband symbol code in the equalization filter 90 input signal are substantial and likely to affect quantizing or data-slicing results, multiplexers 91 and 92 are each conditioned to reproduce its respective second input signal. Delay circuitry 95 delays the difference output signal of the subtractor 13 by twelve symbol epochs before its application as second input signal to the multiplexer 91. The delay circuitry 95 and the subtractor 93 are conditioned by the multiplexer 91 to differentially combine the difference output signal of the subtractor 13 and that signal as delayed twelve symbol epochs. So, comb filtering occurs which suppresses artifacts of co-channel NTSC interference in the difference output signal from the subtractor 93. This comb filtering undesirably introduces intersymbol interference from the symbol twelve symbol epochs previous, however, so a subsequent intersymbol interference suppression filter is required. An estimate of intersymbol interference from the symbol twelve symbol epochs previous is supplied from the quantizer 16 response as delayed twelve symbol epochs in delay circuitry 96 and supplied to the multiplexer 92 as second input signal. That is the adder 94, the quantizer 16, and the delay circuitry 96 are conditioned by the multiplexer 92 to operate as the requisite intersymbol interference suppression filter.

The inclusion of the quantizer 16 within the feedback path in the IIR filter portion of the channel equalizer 10 of FIGS. 1 and 2, the channel equalizer 80 of FIG. 5 and the channel equalizer 90 of FIG. 6 implies that the digitized baseband coding is sampled at symbol rate in the channel equalizer output signals. In such case the channel equalizer is of a general type performing "synchronous equalization", and the design of the error detector 21 for decision feedback is conventional. The digitized baseband coding is sampled at symbol rate in the input signal to the channel equalizer as well, with both the FIR filters 11 and 14 being clocked at symbol rate.

Sub-subchapter 8.3.2 "Steady-State performance of Fractionally Spaced Equalizers" on pages 531–535 of the textbook DATA COMMUNICATIONS PRINCIPLES (written by Gitlin, Hayes and Weinstein and published in 1992 by Plenum Press, New York) indicates that equalization at band edges is much improved by operating a channel equalizer at a clock rate twice symbol rate, with the kernel tap spacing in the filters at multiples of one-half of one symbol epoch. Sub-subchapter 8.3.2 further indicates that these advantages obtain for lesser amounts of excess digital bandwidth, such as that provided by operating a channel equalizer at a clock rate four-thirds symbol rate, with the kernel tap spacing in the filters at multiples of three-quarters of one symbol epoch.. These equalizers are of a general type performing "fractionally spaced equalization".

Figure 7:
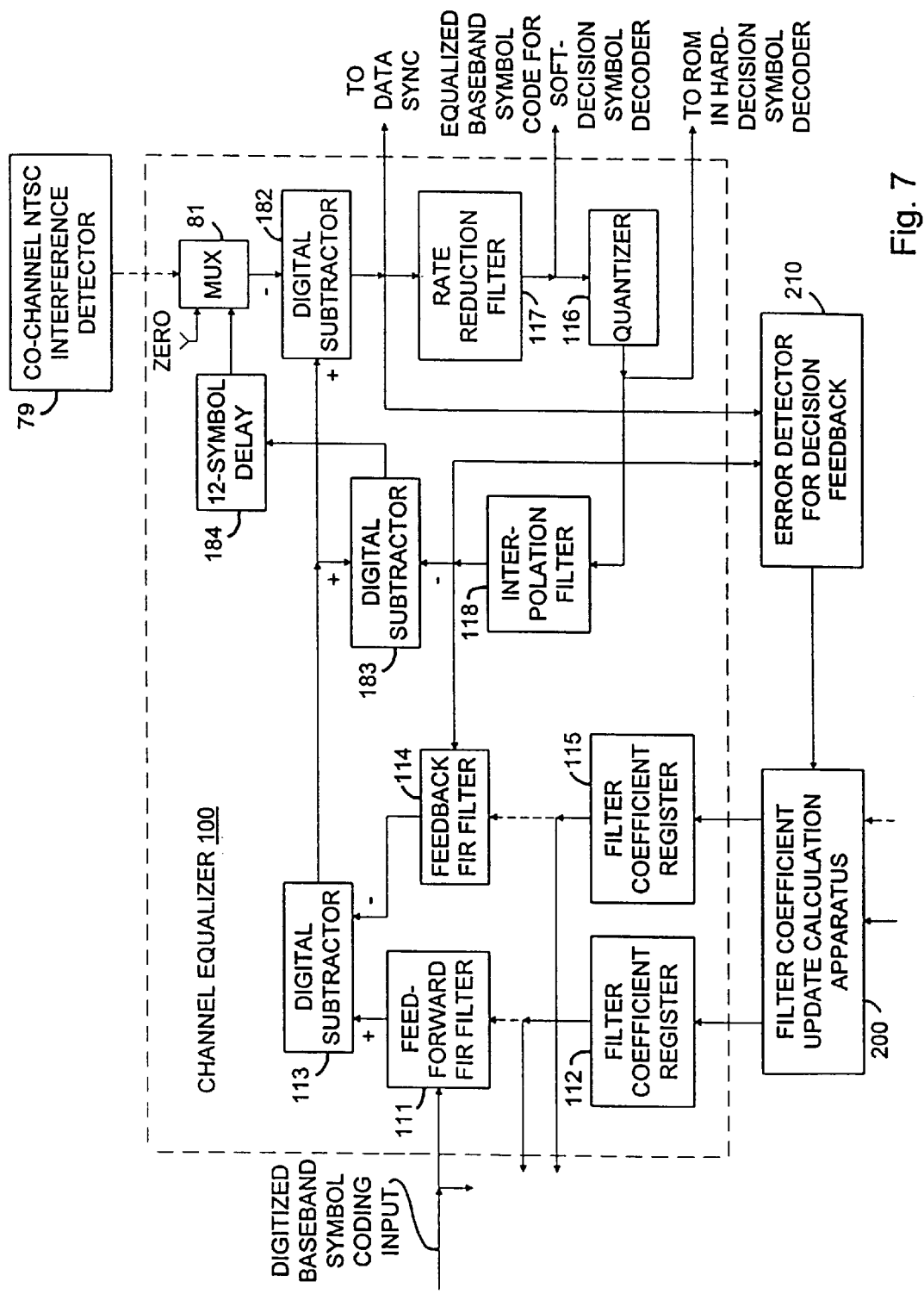
FIG. 7 is a schematic diagram of a channel equalizer that is a further modification of the FIG. 5 channel equalizer, which further modification provides fractionally spaced equalization.

FIG. 7 shows a channel equalizer 100 that replaces the FIG. 5 channel equalizer 80 and provides for fractionally spaced equalization. In the channel equalizer 100 of FIG. 7 a feed-forward FIR filter 111 and a feedback FIR filter 114 are operated at a sample rate k times symbol rate, k being a positive real number larger than one, with baseband symbol code input being digitized to suit. A digital subtractor 113 differentially combines the responses from the FIR filters 111 and 114 at this higher sample rate to supply equalized channel response in which equalization at band edges is much improved, but which is apt at times to contain undesired artifacts of co-channel NTSC interference. Digital subtractors 182 and 183 correspond to the digital subtractors 82 and 83 of the FIG. 5 channel equalization filter 80 except for being clocked at this higher sample rate. The digital subtractors 182 and 183 are operated at this higher rate in order to preserve the digital bandwidth that an error detector 210 requires for generating decision-feedback error signal at this higher sample rate. Generating decision-feedback error signal at this higher sample rate is necessary when fractional equalization is employed, because of the closer tap spacings in the FIR filters 111 and 114. A delay circuit 183 clocked at the higher sample rate k times the symbol rate replaces the delay circuit 83 of the FIG. 5 channel equalizer 80. Presuming the delay circuits 83 and 183 both to be implemented as shift registers, the delay circuit 183 has k times as many shift-register stages as the delay circuit 83 so its overall delay is still twelve symbol epochs despite its faster clocking.

A digital-rate reduction filter 117 re-samples the subtractor 182 difference output signal to symbol rate to generate suitable input signal for a quantizer 116, which makes decisions as to the values of the symbols on a symbol by symbol basis similar to the quantizer 16 in the channel equalizer 80. The quantizer 116 output signal is supplied to a digital-rate interpolation filter 118 for re-sampling back to the higher sample rate used for clocking the FIR filters 111 and 114. The interpolation filter 118 response provides decision information at the same sample rate as the input signal supplied to the digital-rate reduction filter 117. An error detector 210 differentially combines the interpolation filter 118 response and the input signal to the digital-rate reduction filter 117 to generate decision-feedback error signal estimates at the higher sample rate. This error signal is used by filter coefficient update calculation apparatus 200, which operates similarly to the apparatus 20 in the FIG. 5 channel equalizer 80, except for operating at the higher sample rate.

The filter-coefficient-update calculation apparatus 200 updates the contents of the temporary storage registers 112 and 115 that hold the adaptive filter coefficients for the FIR filters 111 and 114 respectively. The temporary storage registers 112 and 115 are of the same general construction as the temporary storage registers 12 and 15 used in the channel equalizer 80 of FIG. 5 and in the channel equalizer 10 of FIGS. 1 and 2. However, when fractional equalization is used, the temporary storage registers 112 and 115 are relatively extended in their lengths to store more coefficients owing to the increased numbers of taps used in the equalizer component filters 111 and 114. The channel characterization supplied to the filter-coefficient-update calculation apparatus 200 is calculated with finer temporal resolution.

The digital filters in prior-art channel equalizers have tended to use single-sample-interval spacing of taps in their kernels, with synchronous equalization being provided for by clocking the filters at a sample rate equal to symbol rate, and with fractional equalization being provided for by clocking the filters at a sample rate higher than symbol rate. However, the filters in a channel equalizer can use plural-sample-interval spacing of taps in their kernels, with the rate of clocking being proportionately increased so that equalization characteristics are not changed. For example, filter structures generally similar to those of FIGS. 7 and 8 can be used with the number of samples between kernel taps chosen to implement synchronous equalization rather than fractional equalization. It is desirable to clock the filters in the channel equalizer at a sample rate higher than symbol rate for other reasons besides implementing fractional equalization, one being to improve the recovery of data synchronizing information.

It is desirable to recover data synchronizing information for data synchronization circuitry such as the FIG. 4 circuitry 60 from a point after the channel equalizer, rather than before the channel equalizer. So long as co-channel NTSC interference can be expected that will generate undesirable demodulation artifacts, it is desirable to recover data synchronizing information after the cascade connection of channel equalizer and the filter for suppressing co-channel NTSC demodulation artifacts in the channel equalizer response. Recovering data synchronizing information from the baseband signal after channel equalization and suppression of co-channel NTSC demodulation artifacts is particularly desirable in regard to determining symbol timing, so as to avoid problems of jitter in symbol timing that arise from multipath distortion. Symbol timing recovery is best provided for by extracting frequency-spectrum components subharmonic to the symbol rate from the equalized baseband signal using narrowband bandpass filtering. The sampling rate for the digitized baseband signal must be high enough to resolve the phase variations of the frequency-spectrum components extracted for determining symbol timing. Symbol timing is more easily determined from a baseband signal digitized at a sampling rate substantially above symbol rate, such as twice symbol rate.

Figure 8:
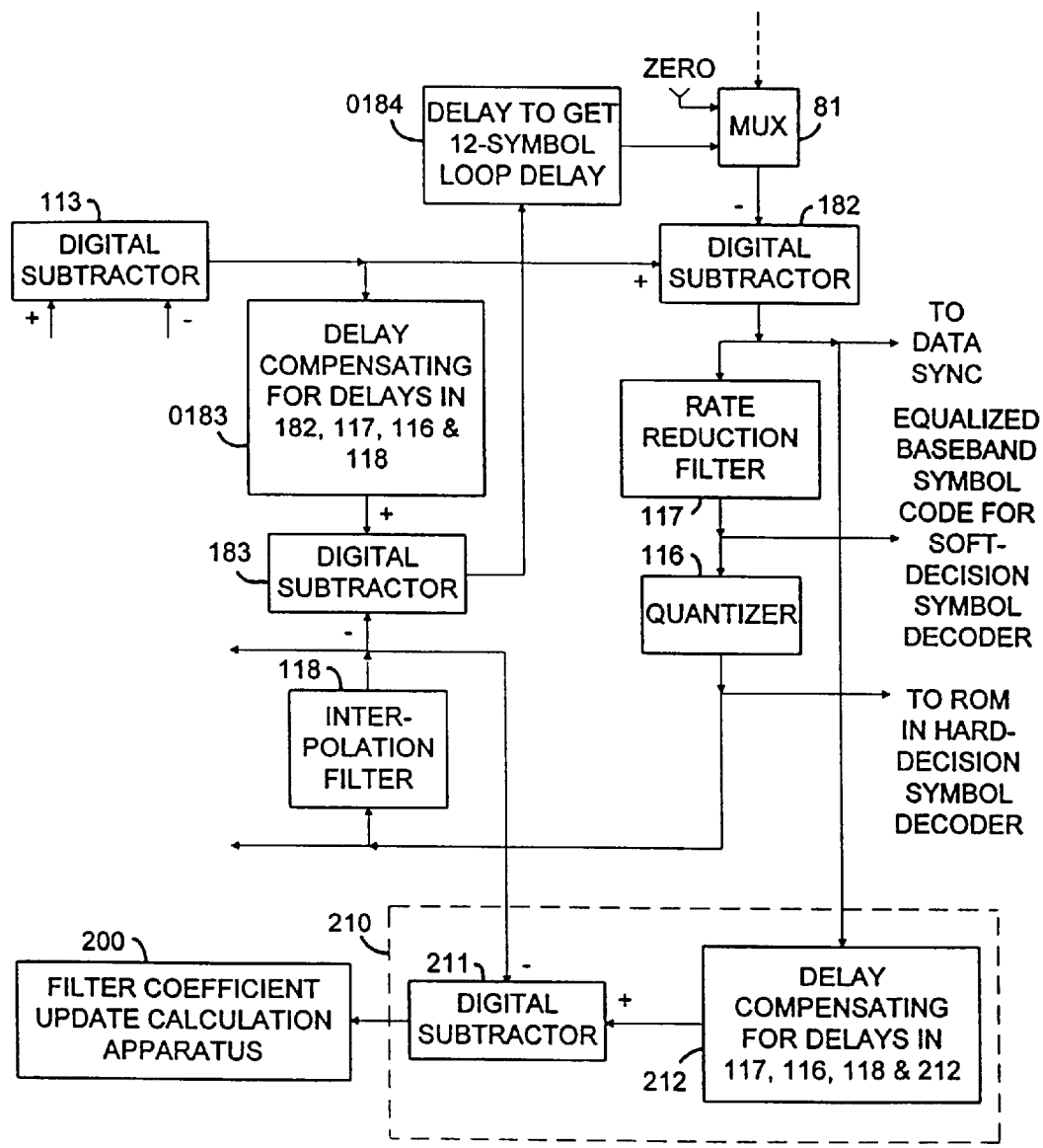
FIG. 8 is a schematic diagram showing practical details of the FIG. 7 channel equalizer, with regard to compensating for latent delays in rate-reduction and interpolation filters.

FIG. 8 shows how latent delays in the rate-reduction filter 117 and the interpolation filter 118 are compensated for in practical constructions of the FIG. 7 channel equalizer 100. The delay circuit 184 that FIG. 7 shows in idealized construction for obtaining a 12-symbol-epochs delay in the feedback loop used to generate the revised estimate of the demodulation artifacts of co-channel NTSC interference is replaced in FIG. 8 by a delay circuit 0184. The delay circuit 0184 has delay shorter than twelve symbol epochs. This shorter delay added to the combined latent delays of the subtractor 182, the rate-reduction filter 117, the quantizer 116, the interpolation filter 118 and the subtractor 183 provides 12-symbol-epochs delay in the feedback loop.

A delay circuit 0183 delays the minuend input signal to the digital subtractor 183 to compensate for its subtrahend input signal being delayed by the combined latent delays of the subtractor 182, the rate-reduction filter 117, the quantizer 116 and the interpolation filter 118.

Figure 9:
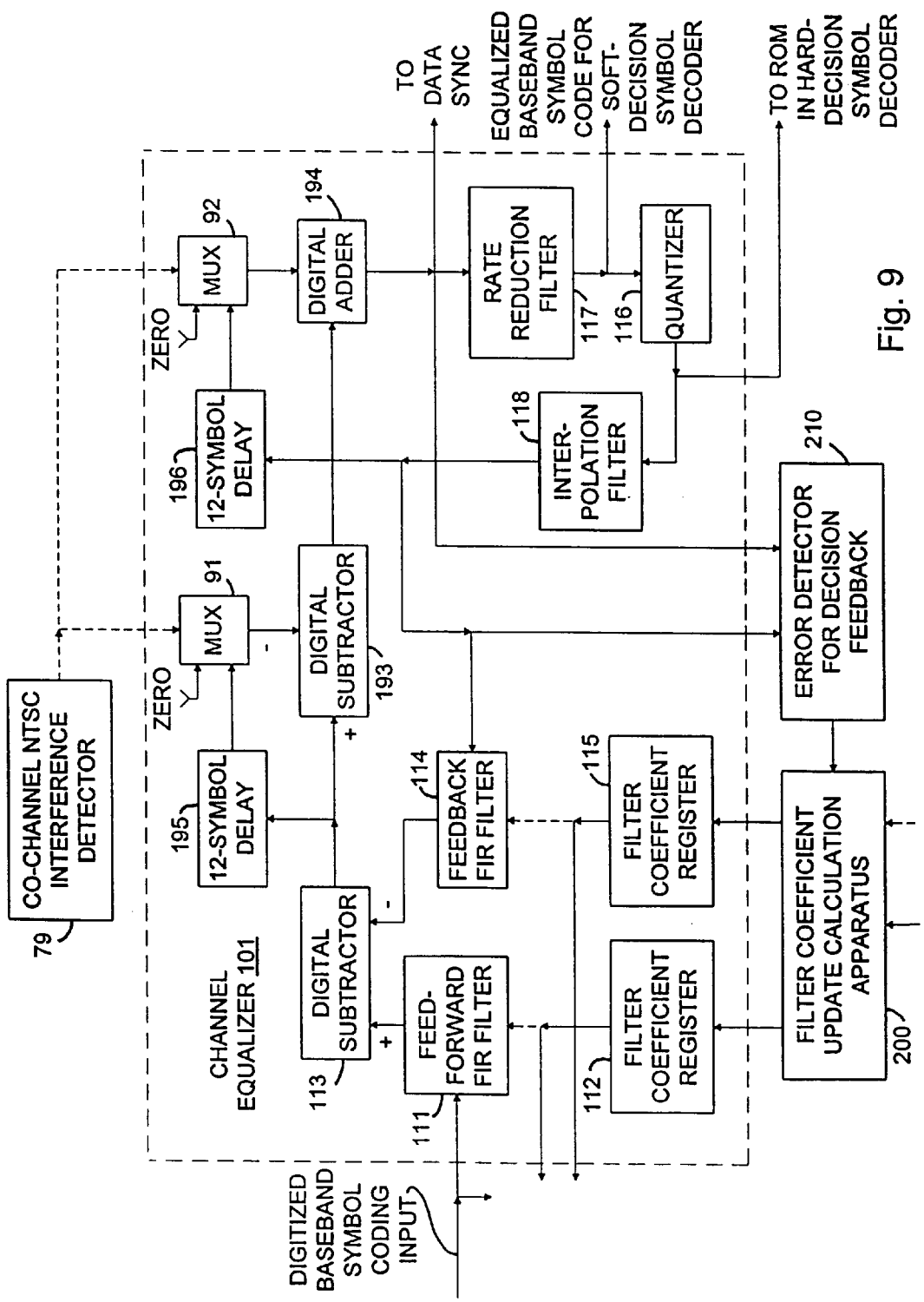
FIG. 9 is a schematic diagram of a channel equalizer that is a further modification of the FIG. 6 channel equalizer, which further modification provides fractionally spaced equalization.

FIG. 9 shows construction details of the error detector 210 for determining the error signal used in decision-feedback calculations by the filter-coefficient-update calculation apparatus 200. The error detector 210 includes a digital subtractor 211 for differentially combining the channel equalizer 100 output signal supplied at the sample rate k times symbol rate $f_s$ with that signal as decimated to symbol rate, quantized, and restored to the $kf_s$ sample rate to supply the interpolation filter 118 response. The error detector 210 also includes a delay circuit 212 for delaying the subtrahend input signal to the digital subtractor 211 to compensate for its minuend input signal being delayed by the combined latent delays of the rate-reduction filter 117, the quantizer 116 and the interpolation filter 118.

FIG. 9 shows a channel equalizer 101 that replaces the FIG. 6 channel equalizer 90 and provides for fractionally spaced equalization. In channel equalizer 101 of FIG. 9 the feed-forward FIR filter 111 and the feedback FIR filter 114 are operated at a sample rate k times symbol rate, k being a positive real number larger than one, with baseband symbol code input being digitized to suit. The coefficient registers 112 and 115, the subtractor 113, the quantizer 116, the rate reduction filter 117, the interpolation filter 118, the filter-coefficient-update calculation apparatus 200 and the error detector 210 also operate similarly to the correspondingly numbered elements in the FIG. 7 channel equalizer 100. The FIG. 9 channel equalizer 101 differs from the FIG. 7 channel equalizer 100 in the way that artifacts of co-channel NTSC interference that appear in the subtractor 113 are suppressed in the input signal to the rate reduction filter 117.

Artifacts of co-channel NTSC interference are suppressed similarly to the way employed in the FIG. 6 equalization filter 90. Digital subtractor 193 and digital adder 194 correspond to the subtractor 93 and the adder 94 of the FIG. 6 channel equalizer 90 except for being clocked at a sample rate k times symbol rate. The subtractor 193 and the adder 194 are operated at this higher rate in order to preserve the digital bandwidth that the error detector 210 requires for generating decision-feedback error signal at this higher sample rate to accommodate the closer tap spacings in the FIR filters 111 and 114 when fractional equalization is employed. Delay circuits 195 and 196 clocked at the higher sample rate k times the symbol rate replace the delay circuits 95 and 96 of the FIG. 6 channel equalizer 90. Presuming the delay circuits 95, 96, 195 and 196 to be implemented as shift registers, the delay circuits 195 and 196 have k times as many shift-register stages as their counterpart delay circuits 95 and 96. This is so the overall delay of each of the delay circuits 195 and 196 is still twelve symbol epochs despite its faster clocking.

Figure 10:
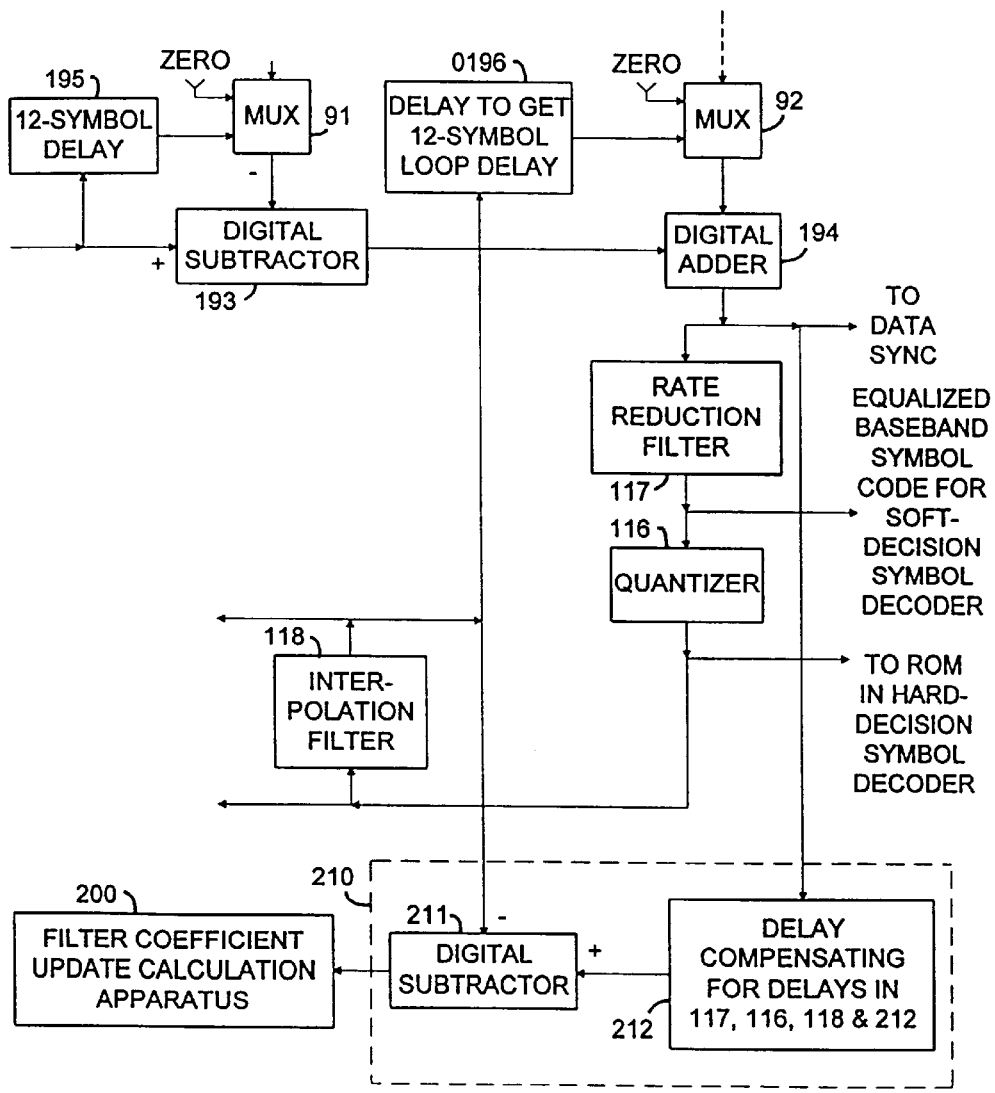
FIG. 10 is a schematic diagram showing practical details of the FIG. 9 channel equalizer, with regard to compensating for latent delays in rate-reduction and interpolation filters.

FIG. 10 shows how latent delays in the rate-reduction filter 117 and the interpolation filter 118 are compensated for in practical constructions of the FIG. 9 channel equalizer 101. The delay circuit 196 that FIG. 9 shows in idealized construction for obtaining a 12-symbol-epochs delay in the feedback loop used to suppress intersymbol interference is replaced in FIG. 10 by a delay circuit 0196 that has shorter delay which added to the combined latent delays of the adder 194, the rate-reduction filter 117, the quantizer 116 and the interpolation filter 118 provides 12-symbol-epochs delay in the feedback loop. The error detector 210 for determining the error signal used in decision-feedback calculations by the filter-coefficient-update calculation apparatus 200 is similar to that shown in FIG. 8, including the subtractor 211 and the delay circuit 212 compensating for the combined latent delays of the rate-reduction filter 117, the quantizer 116 and the interpolation filter 118.

Figure 11:
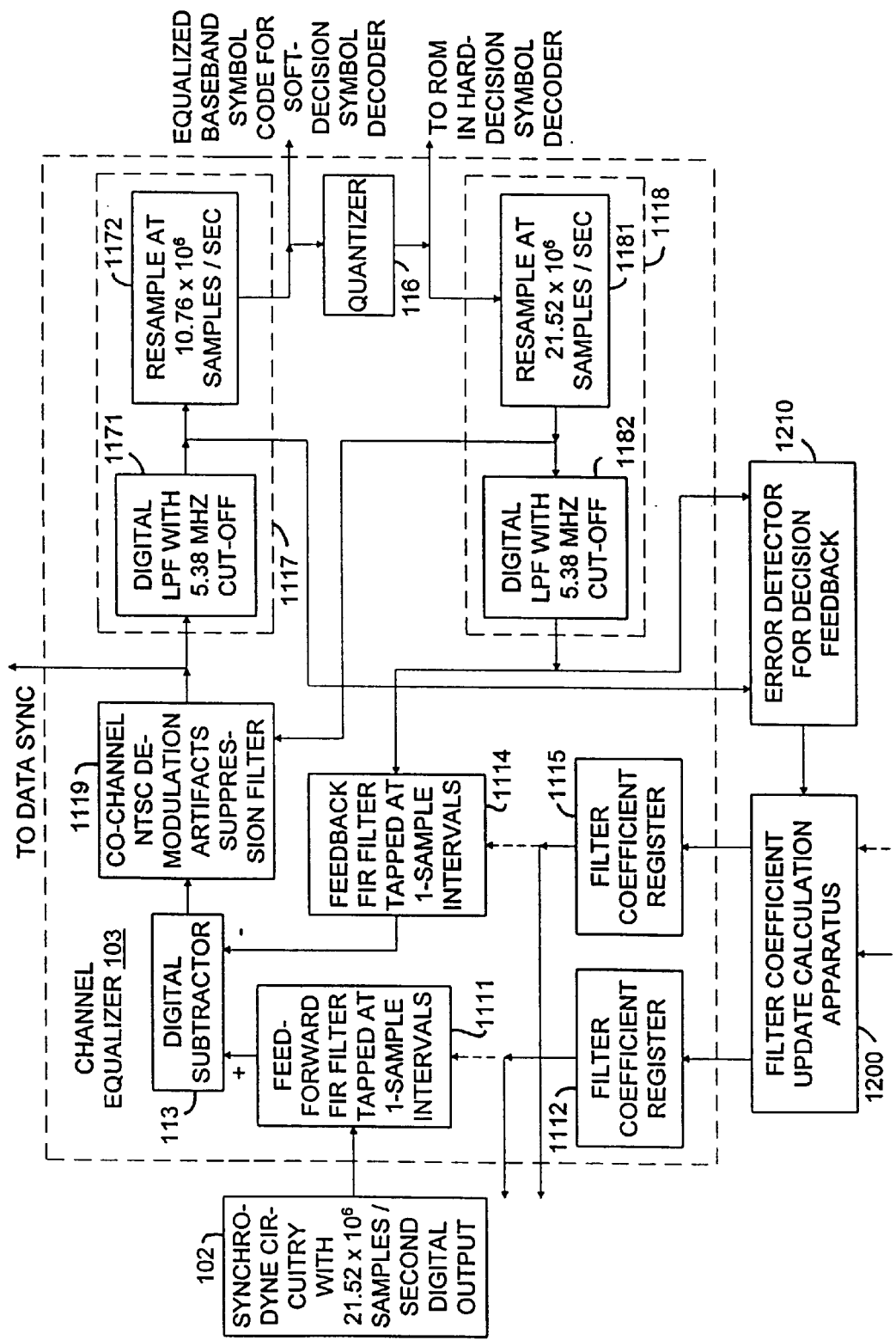
FIG. 11 is a schematic diagram of synchrodyne circuitry followed by a channel equalizer of the type shown in FIG. 7 or 9 operated as an adaptive fractional equalizer with adjustable weighting of taps at half-symbol intervals.

FIG. 11 shows synchrodyne circuitry 102 for supplying to a channel equalizer 103 with baseband symbol code at a 21,524,465 samples-per-second sampling rate. The channel equalizer 103 corresponds in its general construction to the FIG. 7 channel equalizer 100 or to the FIG. 9 channel equalizer 101. In the FIG. 11 channel equalizer 103, the elements 111, 112, 114, 115, 117, 118, 200 and 210 take specific forms 1111, 1112, 1114, 1115, 1117, 1118, 1200 and 1210. The FIR filters 1111 and 1114 are operated at 21,524, 465 samples-per-second clockthrough rate, which is twice symbol rate, and have taps at one-sample intervals for operating the channel equalizer as an adaptive fractional equalizer with adjustable weighting of taps at one-half-symbol intervals.

FIG. 11 shows connections for applying the difference output signal from the subtractor 116 as input signal to a filter 1119 for suppressing demodulation artifacts of a co-channel interfering NTSC signal, if such obtain, and for applying the filter 1119 response to the rate-reduction filter 1117. In an embodiment of the channel equalizer 103 corresponding in its construction to the FIG. 7 channel equalizer 100, the co-channel NTSC demodulation artifacts suppression filter 1119 comprises elements 81, 182, 183 and 184 as shown in FIG. 7. In an alternative embodiment of the channel equalizer 103 corresponding in its construction to the FIG. 9 channel equalizer 101, the co-channel NTSC demodulation artifacts suppression filter 1119 comprises elements 91, 92, 193, 194, 195 and 196 as shown in FIG. 9. With the 21,524,465 samples-per-second clocking rate used in the channel equalizer 103, demodulation artifacts of video carrier are best suppressed by the co-channel NTSC demodulation artifacts suppression filter 1119 if the nominally twelve-symbol delay is a 23-sample-epoch delay. When NTSC broadcasting is no longer done, the filter 1119 need not be used, so the subtractor 116 output connection can connect directly to the input connection of the rate-reduction filter 1117.

In the FIG. 11 channel equalizer 103, the rate-reduction filter 1117 includes a finite-impulse-response digital lowpass filter 1171 for restricting the bandwidth of the channel equalizer 103 response and includes a re-sampler (decimator) 1172 for re-sampling the filter 1171 response to 10,662,238 samples-per-second sampling rate for application to the quantizer 116 at symbol rate. The digital lowpass filter 1171 is designed to cooperate with filtering in the transmitter to provide a raised cosine filter response rolling off 6 dB at half-symbol rate. This restriction of the bandwidth of the channel equalizer 103 response avoids intersymbol interference (ISI) in the 2:1 decimator 1172 response supplied to the quantizer 116. The quantizer 116 response is a series of estimates of the symbols transmitted by the broadcaster. This series of estimates can be treated as an analog signal changing step value at one-symbol intervals, which equivalent analog signal has unlimited bandwidth when sampled at a multiple of symbol rate. This simplifies the construction of the interpolation filter 1118.

FIG. 11 shows the interpolation filter 1118 as including a re-sampler 1181 for re-sampling the quantizer 116 response to 21,524,465 samples-per-second sampling rate and a finite-impulse-response digital lowpass filter 1182 for restricting the bandwidth of the re-sampler 1181 response. The FIR digital lowpass filter 1182 provides a raised cosine filter response rolling off 6 dB at half-symbol rate, so the estimated transmitted signal supplied from the filter 1182 is suitable for comparison in the decision-feedback error detector 1210 with the actual received signal supplied from the FIR digital lowpass filter 1171. The error detector 1210 delays the lowpass filter 1171 response before comparison to compensate for the delays of the re-samplers 1172 and 1181, the delay of the quantizer 116, and difference in delays through the filters 1171 and 1182. The re-sampler 1181 response is of appropriate 21,524,465 samples-per-second sampling rate for feeding back to the co-channel NTSC demodulation artifacts suppression filter 1119. The interpolation filter 1118 response is of appropriate 21,524,465 samples-per-second sampling rate for feeding back to the feedback FIR filter 1114 of the channel equalizer 103 and for being compared with the delayed lowpass filter 1171 response in the decision-feedback error detector 1210. The error detector 1210 generates decision-feedback error signal at twice the rate that the filter-coefficient-update calculation apparatus 1200 requires for calculating updates for the weighting coefficients for the FIR filters 1111 and 1114. Accordingly, the calculation apparatus 1200 selects its input signal by decimating three-to-one the decision-feedback signal supplied by the error detector 1210.

With the channel equalizer 103 operated at 21,524,465 samples-per-second clockthrough rate, the feedback FIR filter 1114 must have at least 861 samples of delay in order to suppress post-ghosts with up to 40 microsecond delay respective to principal received signal. The feed-forward FIR filter 1111 must have at least 64 samples of delay in order to suppress pre-ghosts that lead the principal received signal up to 3 microseconds, but is usually designed to have somewhat more samples of delay. The one-symbol tap spacing means that somewhere around a thousand multipliers are used for applying the filter weights to the FIR filters 1111 and 1114. A reduction in the number of multipliers required for applying adjustable tap weights to the FIR filters 111 and 114 is possible by re-designing the fractional equalizer to place its taps at larger rational fractions of symbol spacing. A fractional equalizer with taps at two-thirds-symbol-epoch or three-quarters-symbol-epoch spacing is operable without the sampling rate climbing to too high a frequency, so as to risk generating signals that will be detected by the DTV receiver tuner. Post-ghosts with up to 40 microsecond delay respective to principal received signal can be suppressed with a feedback FIR filter having only 646 taps at two-thirds-symbol-epoch spacing or only 574 taps at three-quarters-symbol-epoch spacing.

Figure 12:
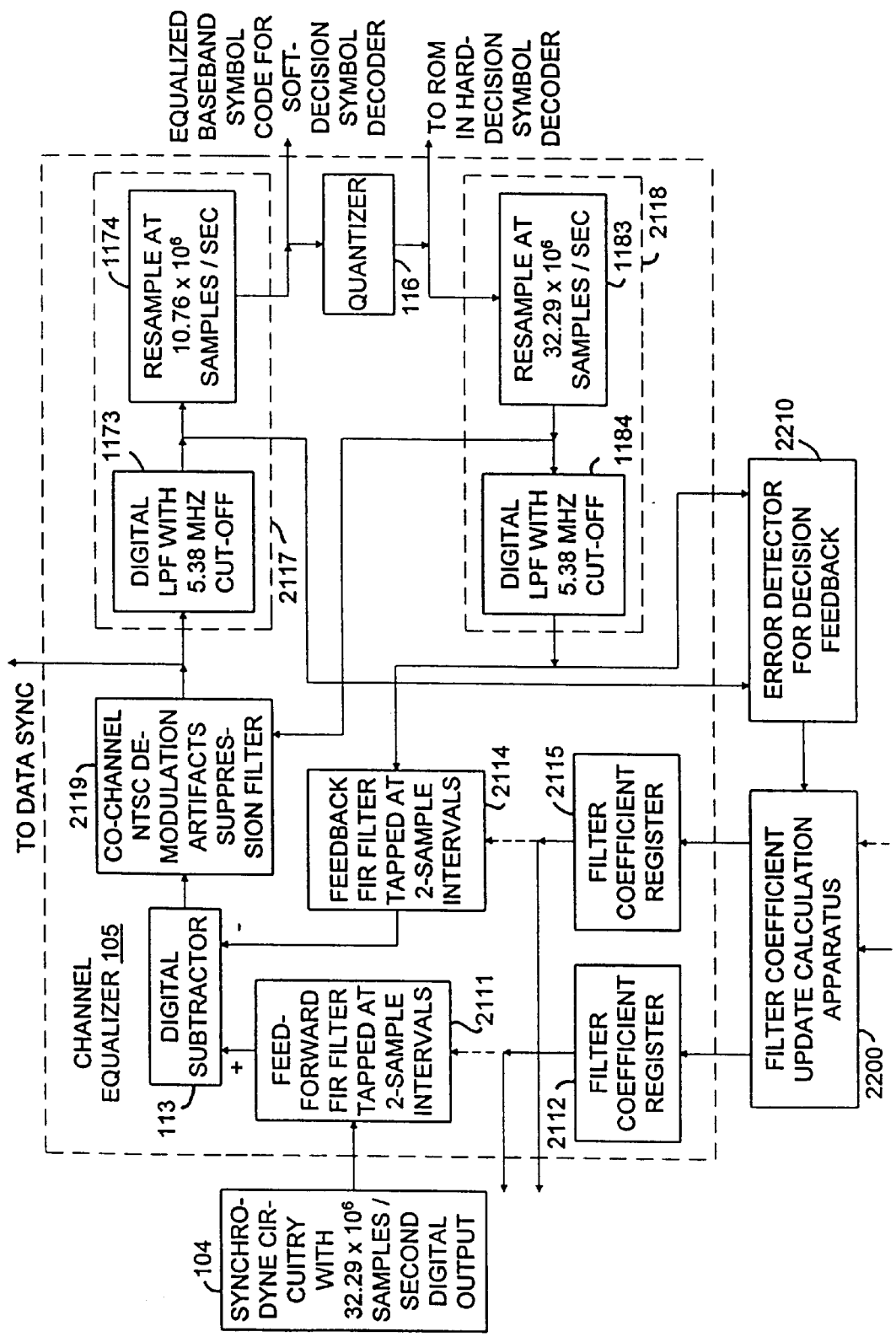
FIG. 12 is a schematic diagram of synchrodyne circuitry followed by a channel equalizer of the type shown in FIG. 7 or 9 operated as an adaptive fractional equalizer with adjustable weighting of taps at two-thirds-symbol intervals in accordance with aspects of the invention.

FIG. 12 shows synchrodyne circuitry 104 for supplying to a channel equalizer 105 with baseband symbol code at a 32,289,780 samples-per-second sampling rate. The channel equalizer 105 corresponds in its general construction to the FIG. 11 channel equalizer 103. In the FIG. 12 channel equalizer 105, the elements 2111, 2112, 2114, 2115, 2117, 2118, 2119, 2200 and 2210 generically correspond to the elements 1111, 1112, 1114, 1115, 1117, 1118, 1119, 1200 and 1210, respectively, of the FIG. 11 channel equalizer 103. The generically corresponding elements differ specifically, however, to take into account the differences in clocking rates through the two channel equalizers 103 and 105. In the FIG. 12 channel equalizer 105, the feed-forward FIR filter 2111 and the feedback FIR filter 2114 are operated at 32,289,780 samples-per-second clockthrough rate, which is three times symbol rate, and have taps at two-sample intervals operating the channel equalizer as an adaptive fractional equalizer with adjustable weighting of taps at two-thirds-symbol intervals. With the 32,289,780 samples-per-second clocking rate used in the channel equalizer 105, demodulation artifacts of video carrier are best suppressed by the co-channel NTSC demodulation artifacts suppression filter 2119 if the nominally twelve-symbol delay is a 17-sample-epoch delay.

In the FIG. 12 channel equalizer 105, the rate-reduction filter 2117 includes a finite-impulse-response digital lowpass filter 1173 for restricting the bandwidth of the channel equalizer 105 response and a re-sampler (decimator) 1174 for re-sampling the filter 1173 response to 10,662,238 samples-per-second sampling rate for application to the quantizer 116 at symbol rate. The digital lowpass filter 1173 is designed to cooperate with filtering in the transmitter to provide a raised cosine filter response rolling off 6 dB at half-symbol rate. This restriction of the bandwidth of the channel equalizer 105 response avoids intersymbol interference (ISI) in the 3:1 decimator 1174 response supplied to the quantizer 116. The quantizer 116 response is a series of estimates of the symbols transmitted by the broadcaster. This series of estimates can be treated as an analog signal changing value at one-symbol intervals, which equivalent analog signal has unlimited bandwidth when sampled at a multiple of symbol rate. This simplifies the construction of the interpolation filter 2118.

FIG. 12 shows the interpolation filter 2118 as including a re-sampler 1183 for re-sampling the quantizer 116 response to 32,289,780 samples-per-second sampling rate and a finite-impulse-response digital lowpass filter 1184 for restricting the bandwidth of the re-sampler 1183 response. The FIR digital lowpass filter 1184 provides a raised cosine filter response rolling off 6 dB at half-symbol rate, so the estimated transmitted signal supplied from the filter 1184 is suitable for comparison in the decision-feedback error detector 2210 with the actual received signal supplied from the FIR digital lowpass filter 1173. The error detector 2210 delays the lowpass filter 1173 response before comparison to compensate for the delays of the re-samplers 1174 and 1183, the delay of the quantizer 116, and the difference in delays through the filters 2171 and 2182. The re-sampler 1183 response supplied at the rate of 32,289,780 samples per second is of appropriate sample rate for feeding back to the co-channel NTSC demodulation artifacts suppression filter 2119. The interpolation filter 2118 response also supplied at the rate of 32,289,780 samples per second is of appropriate sample rate for feeding back to the feedback FIR filter 2114 of the channel equalizer 105 and for being compared with the delayed lowpass filter 1173 response in the decision-feedback error detector 2210. The error detector 2210 generates decision-feedback error signal at twice the rate that the filter-coefficient-update calculation apparatus 2200 requires for calculating updates for the weighting coefficients for the FIR filters 2111 and 2114. Accordingly, the calculation apparatus 2200 selects its input signal by decimating two-to-one the decision-feedback signal supplied by the error detector 2210.

Figure 13:
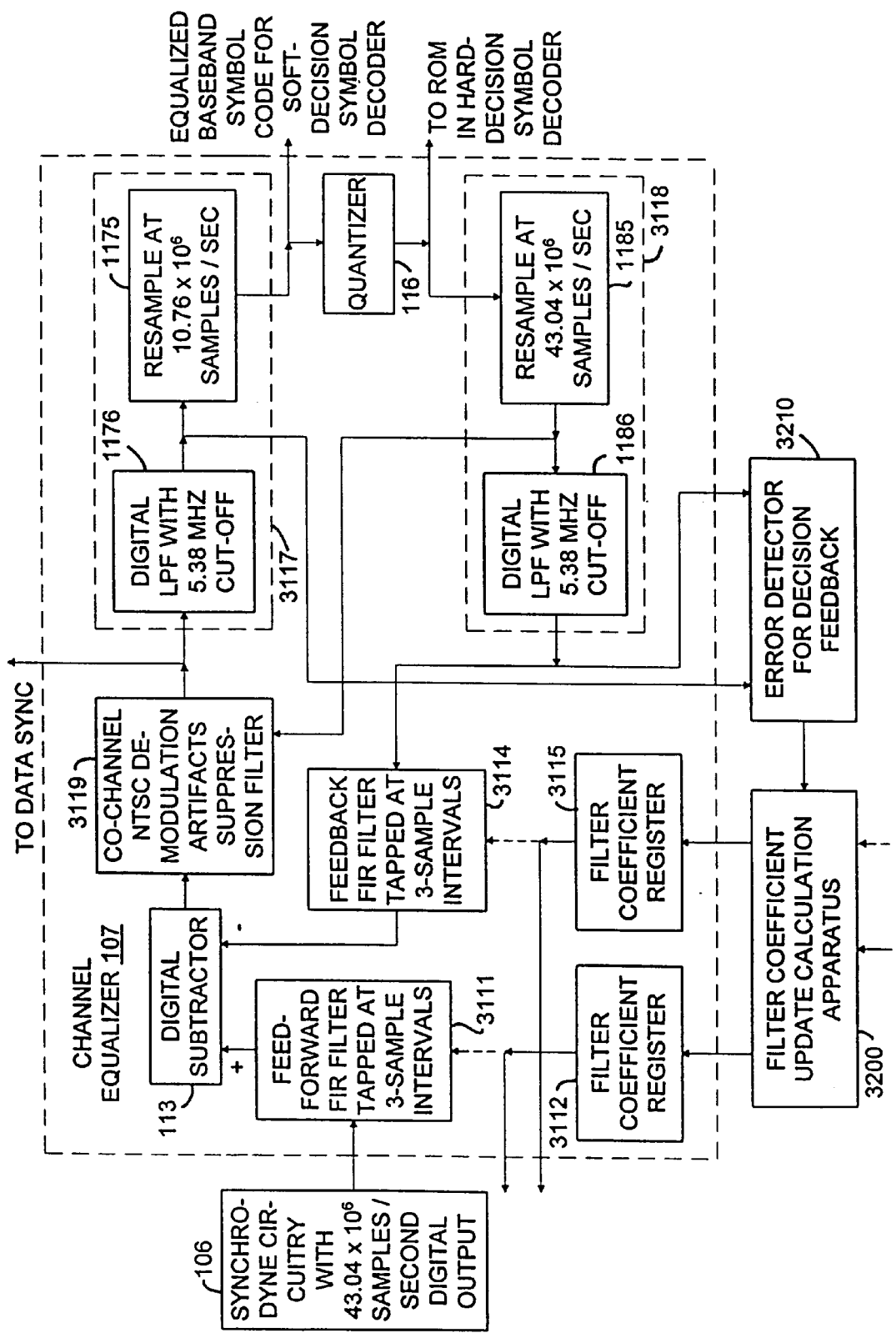
FIG. 13 is a schematic diagram of synchrodyne circuitry followed by a channel equalizer of the type shown in FIG. 7 or 9 operated as an adaptive fractional equalizer with adjustable weighting of taps at three-quarters-symbol intervals in accordance with aspects of the invention.

FIG. 13 shows synchrodyne circuitry 106 for supplying to a channel equalizer 107 with baseband symbol code at a 43,048,951 samples-per-second sampling rate, which is four times symbol rate. The channel equalizer 107 corresponds in its general construction to the channel equalizers 103 and 105 of FIGS. 11 and 12. In the FIG. 13 channel equalizer 107, the elements 3111, 3112, 3114, 3115, 3117, 3118, 3119, 3200 and 3210 generically correspond to the elements 1111, 1112, 1114, 1115, 1117, 1118, 1119, 1200 and 1210, respectively, of the FIG. 11 channel equalizer 103 or to the elements 2111, 2112, 2114, 2115, 2117, 2118, 2119, 2200 and 2210, respectively, of the FIG. 12 channel equalizer 105. However, the elements differ specifically to take into account the differences of the clocking rate through the equalizer 107 from the clocking rates through the equalizers 103 and 105. In the FIG. 13 channel equalizer 107, the feed-forward FIR filter 3111 and the feedback FIR filter 3114 are operated at 43,048,951 samples-per-second clock-through rate, which is four times symbol rate, and have taps at three-sample intervals operating the channel equalizer as an adaptive fractional equalizer with adjustable weighting of taps at three-quarter-symbol intervals. With the 43,048,951 samples-per-second clocking rate used in the channel equalizer 107, demodulation artifacts of video carrier are best suppressed by the co-channel NTSC demodulation artifacts suppression filter 3119 if a nominally twelve-symbol delay is a 15-sample-epoch delay.

In the FIG. 13 channel equalizer 107, the rate-reduction filter 3117 includes a finite-impulse-response digital lowpass filter 1175 for restricting the bandwidth of the channel equalizer 107 response and a re-sampler (decimator) 1176 for re-sampling the filter 1175 response to 10,662,238 samples-per-second sampling rate for application to the quantizer 116 at symbol rate. The digital lowpass filter 175 is designed to cooperate with filtering in the transmitter to provide a raised cosine filter response rolling off 6 dB at half-symbol rate. This restriction of the bandwidth of the channel equalizer 107 response avoids intersymbol interference (ISI) in the 4:1 decimator 1176 response supplied to the quantizer 116. The quantizer 116 response is a series of estimates of the symbols transmitted by the broadcaster. This series of estimates can be treated as an analog signal changing value at one-symbol intervals, which equivalent analog signal has unlimited bandwidth when sampled at a multiple of symbol rate. This simplifies the construction of the interpolation filter 3118.

FIG. 13 shows the interpolation filter 3118 as including a re-sampler 1185 for re-sampling the quantizer 116 response to 43,048,951 samples-per-second sampling rate and a finite-impulse-response digital lowpass filter 1186 for restricting the bandwidth of the re-sampler 1185 response. The FIR digital lowpass filter 1186 provides a raised cosine filter response rolling off 6 dB at half-symbol rate, so the estimated transmitted signal supplied from the filter 1186 is suitable for comparison in the decision-feedback error detector 3210 with the actual received signal supplied from the FIR digital lowpass filter 1175. The error detector 3210 delays the lowpass filter 1175 response before comparison to compensate for the delays of the re-samplers 1176 and 1185, the delay of the quantizer 116, and difference in delays through the filters 1175 and 1186. The re-sampler 1185 response supplied at the rate of 43,048,951 samples per second is of appropriate sample rate for feeding back to the co-channel NTSC demodulation artifacts suppression filter 3119. The interpolation filter 3118 response also supplied at the rate of 43,048,951 samples per second is of appropriate sample rate for feeding back to the feedback FIR filter 3114 of the channel equalizer 107 and for being compared with the delayed lowpass filter 1175 response in the decision-feedback error detector 3210. The error detector 3210 generates decision-feedback error signal at thrice the rate that the filter-coefficient-update calculation apparatus 3200 requires for calculating updates for the weighting coefficients for the FIR filters 3111 and 3114. Accordingly, the calculation apparatus 3200 selects its input signal by decimating three-to-one the decision-feedback signal supplied by the error detector 3210.

What is claimed is:

1. A method for extracting training signal from data field synchronizing signals included in the initial data segments of data fields in a digital television signal, which digital television signal is received as carrier modulation by a digital television receiver provided with an equalizer filter, the weighting coefficients of which equalizer filter are adjusted responsive to said training signal as extracted by said method, said carrier modulation subject to being accompanied at times by co-channel analog television signal, said method comprising the steps of:

demodulating said digital television signal to generate a baseband signal, which baseband signal is accompanied by undesirable demodulation artifacts at said times that said carrier modulation is accompanied by said co-channel analog television signal;

determining the occurrence of the initial data segments of data fields in said digital television signal, as demodulated to baseband to generate said baseband signal;

extracting said training signal by combining the initial data segments of a prescribed number of data fields in said digital television signal as demodulated to baseband to generate said baseband signal, said prescribed number being chosen to reduce the energy of said undesirable demodulation artifacts as compared to the energy of said training signal as so extracted.

2. The method of claim 1 wherein said prescribed number of data fields in said digital television signal having their respective said initial data segments combined for extracting said training signal is divisible by six without remainder.

3. The method of claim 2 wherein, at least at times, said prescribed number of data fields in said digital television signal having their respective said initial data segments combined for extracting said training signal is six.

4. The method of claim 2 wherein, at least at times, said prescribed number of data fields in said digital television signal having their respective said initial data segments combined for extracting said training signal is twelve.

5. The method of claim 2 wherein, at least at times, said prescribed number of data fields in said digital television signal having their respective said initial data segments combined for extracting said training signal is eighteen.

6. Training-signal extraction apparatus for extraction of an equalizer training signal from a baseband digital signal recovered in a digital receiver including an equalizer filter the parameters of which are adjustable in response to said equalizer training signal as thus extracted, said baseband digital signal comprising a succession of data segments of uniform respective durations and being supplied as a result of demodulation of a digital television signal subject at times to interference from a co-channel analog television signal, said data segments of said digital television signal being arranged in consecutive data fields each composed of a prescribed number of said data segments, said data fields being considered to be consecutively ordinally numbered modulo-six in order of their successive occurrence with each odd-numbered data field and a next-occurring even-numbered data field being considered to be a data frame, an initial data segment of each odd-numbered data field including a respective data field synchronizing signal of a first type similar to that of each other odd-numbered data field, an initial data segment of each even-numbered data field including a respective data field synchronizing signal of a second type similar to that of each other even-numbered data field, corresponding elements of said data field synchronizing signals of said first type being similar in amplitude to corresponding elements of said data field synchronizing signals of said second type, a first set of said corresponding elements of said data field synchronizing signals of said first type being of the same sense of polarity as a first set of corresponding elements of said data field synchronizing signal of said second type, and a second set of said corresponding elements of said data field synchronizing signals of said first type being of opposite sense of polarity from a second set of corresponding elements of said data field synchronizing signal of said second type, said training-signal extraction apparatus comprising:

a first storage register for storing data field synchronizing signal from an integral number of first data fields;

a second storage register for storing data field synchronizing signal from said integral number of second data fields;

a third storage register for storing data field synchronizing signal from said integral number of third data fields;

a fourth storage register for storing data field synchronizing signal from said integral number of fourth data fields;

a fifth storage register for storing data field synchronizing signal from said integral number of fifth data fields;

a sixth storage register for storing data field synchronizing signal from said integral number of sixth data fields;

apparatus for combining corresponding elements of said data field synchronizing signals stored in said first storage register, in said second storage register, in said third storage register, in said fourth storage register, in said fifth storage register, and in said sixth storage register to separate one of said first and second sets of corresponding elements of said data field synchronizing signal from the other of said first and second sets of corresponding elements of said data field synchronizing signal and from demodulation artifacts of any interference from a co-channel analog television signal, the separation of said one of said first and second sets of corresponding elements of said data field synchronizing signal implementing the extraction of said equalizer training signal.

7. Training-signal extraction apparatus as set forth in claim 6, wherein said first storage register, said second storage register, said third storage register, said fourth storage register, said fifth storage register, and said sixth storage register are each operable as an accumulator over said integral number of cycles of modulo-six counting of data fields.

8. Training-signal extraction apparatus as set forth in claim 7, said integral number of cycles of modulo-six counting of data fields is two.

9. Training-signal extraction apparatus as set forth in claim 7, said training-signal extraction apparatus comprising a random-access memory divided into six banks, a first bank of said random-access memory providing said first storage register, a second bank of said random-access memory providing said second storage register, a third bank of said random-access memory providing said third storage register, a fourth bank of said random-access memory providing said fourth storage register, a fifth bank of said random-access memory providing said fifth storage register, and a sixth bank of said random-access memory providing said sixth storage register.

10. Training-signal extraction apparatus as set forth in claim 6, wherein said first storage register, said second storage register, said third storage register, said fourth storage register, said fifth storage register, and said sixth storage register are embodied within a random-access memory.

11. In a radio receiver for a digital television signal comprising a succession of data segments each containing a prescribed number of symbols occurring at a prescribed symbol rate, said data segments of said digital television signal being arranged in consecutive data fields each composed of a prescribed number of said data segments, said data fields being considered to be consecutively ordinally numbered in order of their successive occurrence with each odd-numbered data field and a next-occurring even-numbered data field being considered to be a data frame, an initial data segment of each odd-numbered data field including a respective data field synchronizing signal of a first type similar to that of each other odd-numbered data field, an initial data segment of each even-numbered data field including a respective data field synchronizing signal of a second type similar to that of each other even-numbered data field, corresponding elements of said data field synchronizing signals of said first type being similar in amplitude to corresponding elements of said data field synchronizing signals of said second type, a first set of said corresponding elements of said data field synchronizing signals of said first type being of the same sense of polarity as a first set of corresponding elements of said data field synchronizing signal of said second type, and a second set of said corresponding elements of said data field synchronizing signals of said first type being of opposite sense of polarity from a second set of corresponding elements of said data field synchronizing signal of said second type, the combination comprising:

synchrodyne circuitry for demodulating said digital television signal to supply digital samples of a baseband signal at a sample rate that is k times said symbol rate, k being an integer more than one;

a channel equalizer connected to respond to said digital samples of a baseband signal supplied by said synchrodyne circuitry at said sample rate that is k times said symbol rate, for supplying digital samples of an equalized baseband signal at said sample rate that is k times said symbol rate; and clock generation circuitry responsive to said digital samples of said equalized baseband signal supplied by said channel equalizer at said sample rate that is k times said symbol rate, for generating a first clock signal at said sample rate that is k times said symbol rate.

12. The combination of claim 11, further comprising:

a sample counter connected to receive said first clock signal as a count input signal that occur at said sample rate that is k times said symbol rate for generating a sample count, said sample counter resetting its sample count to a prescribed value responsive to each occurrence of a first reset signal;

a first match filter connected to receive said equalized baseband signal and to respond to said first set of said corresponding elements of said data field synchronizing signal therein for supplying a first match filter response to said sample counter as said first reset signal;

an initial data-segment decoder responsive to said sample count for generating an indication of the occurrence of an initial portion of each said data field; and training-signal extraction apparatus responsive to said indication of the occurrence of the an initial portion of each said data field for extracting a training signal from said digital samples of an equalized baseband signal supplied by said channel equalizer at said sample rate that is k times said symbol rate.

13. The combination of claim 12, further comprising:

an end-of-data-field decoder connected to receive said sample count, for generating an end-of-data-field indication responsive to the occurrence of a specific sample count;

a data field counter connected for receiving as its count input signal said end-of-data-field indications from said end-of-data-field decoder, said data field counter connected for supplying a data field count to said training-signal extraction apparatus as a control signal for its operations, said data field count reset to a prescribed value responsive to each occurrence of a second reset signal;

a second match filter connected to receive said equalized baseband signal and to respond to said second set of said corresponding elements of said data field synchronizing signal therein for supplying a second match filter response; and logic circuitry responsive to second match filter response occurring when said data field count is one of incorrect value to apply said second reset signal to said data field counter for resetting its data field count to said prescribed value.

14. The combination of claim 13, wherein said data field counter supplies a data field count at least a portion of which provides a modulo-six count of data fields, and wherein said training-signal extraction apparatus comprises:

a first storage register for storing data field synchronizing signal as selected from an integral number of first data fields responsive to a prescribed range of sample count occurring at times said modulo-six count of data fields is one;

a second storage register for storing data field synchronizing signal as selected from said integral number of second data fields responsive to said prescribed range of sample count occurring at times said modulo-six count of data fields is two;

a third storage register for storing data field synchronizing signal as selected from said integral number of third data fields responsive to said prescribed range of sample count occurring at times said modulo-six count of data fields is three;

a fourth storage register for storing data field synchronizing signal as selected from said integral number of fourth data fields responsive to said prescribed range of sample count occurring at times said modulo-six count of data fields is four;

a fifth storage register for storing data field synchronizing signal as selected from said integral number of fifth data fields responsive to said prescribed range of sample count occurring at times said modulo-six count of data fields is five;

a sixth storage register for storing data field synchronizing signal as selected from said integral number of sixth data fields responsive to said prescribed range of sample count occurring at times said modulo-six count of data fields is six or zero; and apparatus for combining corresponding elements of said data field synchronizing signals stored in said first storage register, in said second storage register, in said third storage register, in said fourth storage register, in said fifth storage register, and in said sixth storage register to separate one of said first and second sets of corresponding elements of said data field synchronizing signal from the other of said first and second sets of corresponding elements of said data field synchronizing signal and from demodulation artifacts of any interference from a co-channel analog television signal, the separation of said one of said first and second sets of corresponding elements of said data field synchronizing signal implementing the extraction of said equalizer training signal.

15. The combination of claim 11, wherein said clock generation circuitry responds to said digital samples of said equalized baseband signal for generating a second clock signal at said symbol rate, and wherein said channel equalizer supplies equalized baseband signal at said sample rate equal to said symbol rate, as clocked according to said second clock signal.

* * * * *